(12) United States Patent
Sato

(10) Patent No.: US 10,305,406 B2
(45) Date of Patent: May 28, 2019

(54) MOTOR CONTROL APPARATUS, SHEET CONVEYING APPARATUS, DOCUMENT FEEDING APPARATUS, DOCUMENT READING APPARATUS, AND IMAGE FORMING APPARATUS

(71) Applicant: CANON KABUSHIKI KAISHA, Tokyo (JP)

(72) Inventor: Hiroki Sato, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 15/624,497

(22) Filed: Jun. 15, 2017

(65) Prior Publication Data
US 2018/0013366 A1     Jan. 11, 2018

(30) Foreign Application Priority Data

Jul. 7, 2016    (JP) ................. 2016-135204

(51) Int. Cl.
| | |
|---|---|
| *H02P 21/14* | (2016.01) |
| *H02P 21/20* | (2016.01) |
| *B65H 5/06* | (2006.01) |
| *G03G 15/00* | (2006.01) |
| *H02P 6/08* | (2016.01) |
| *H02P 27/08* | (2006.01) |
| *H04N 1/00* | (2006.01) |
| *H02P 8/16* | (2006.01) |
| H02P 21/26 | (2016.01) |
| *H02P 21/18* | (2016.01) |

(52) U.S. Cl.
CPC ............ *H02P 21/20* (2016.02); *B65H 5/062* (2013.01); *G03G 15/6529* (2013.01); *H02P 6/085* (2013.01); *H02P 8/16* (2013.01); *H02P 21/141* (2013.01); *H02P 21/18* (2016.02); *H02P 21/26* (2016.02); *H02P 27/08* (2013.01); *H04N 1/00602* (2013.01); *H04N 1/00604* (2013.01); *H04N 1/00798* (2013.01); *B65H 2301/44318* (2013.01); *B65H 2801/06* (2013.01); *G03G 2215/00679* (2013.01); *G03G 2221/1657* (2013.01); *H04N 2201/0081* (2013.01)

(58) Field of Classification Search
CPC ........................................................ H02P 21/20
USPC ................................................. 318/599, 560
See application file for complete search history.

(56) References Cited

U.S. PATENT DOCUMENTS

| | | | |
|---|---|---|---|
| 6,940,251 B1 * | 9/2005 | Sarlioglu | ................ H02P 21/00 |
| | | | 318/400.34 |
| 8,385,085 B2 * | 2/2013 | Hattori | ............. H02M 7/53871 |
| | | | 363/17 |
| 8,970,146 B2 | 3/2015 | Pollock | |

\* cited by examiner

*Primary Examiner* — David Luo
(74) *Attorney, Agent, or Firm* — Canon U.S.A., Inc. IP Division

(57) ABSTRACT

According to an aspect of the present invention, a motor control apparatus includes a first driving circuit connected to a motor first phase winding and having H bridge circuit first switching elements, a second driving circuit connected to second phase winding of the motor and having H bridge circuit second switching elements, first and second pulse generators. a detector, an estimator, and a selector. The first pulse generator generates a first PWM signal having a first level signal and a second level signal. The second pulse generator generates a second PWM signal having a first and a second level signal. The selector selects whether to detect a driving current flowing through the first phase winding or to estimate a driving current flowing through the first phase winding. The first pulse generator generates the first PWM signal based on a driving current value output from the detector or the estimator.

24 Claims, 11 Drawing Sheets

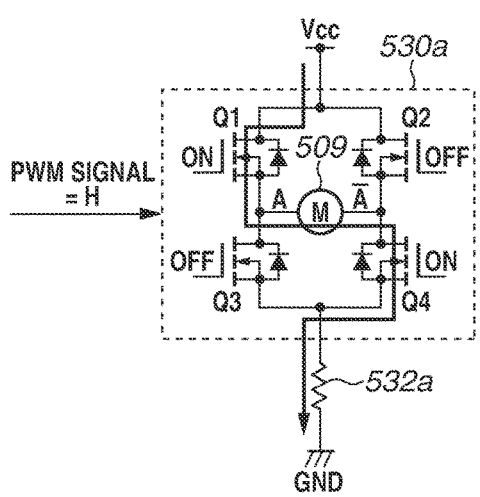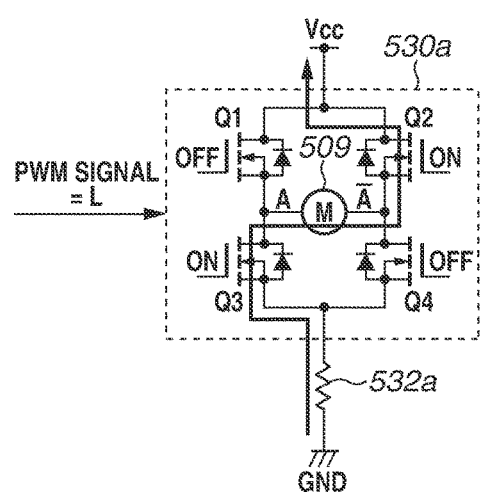

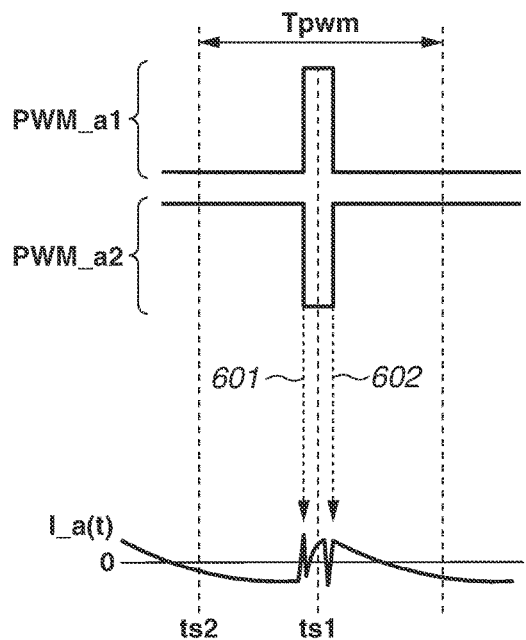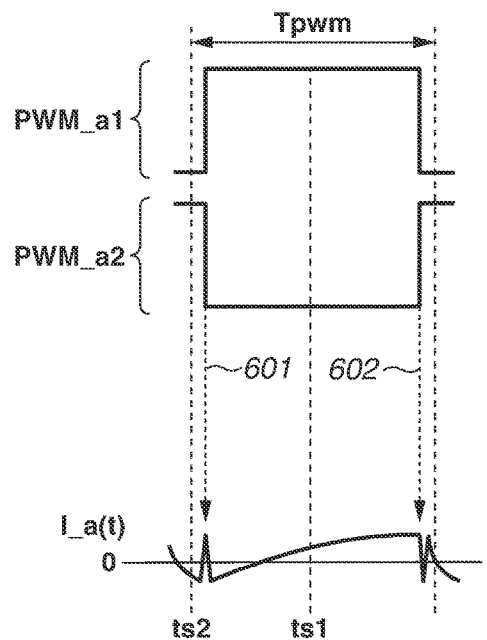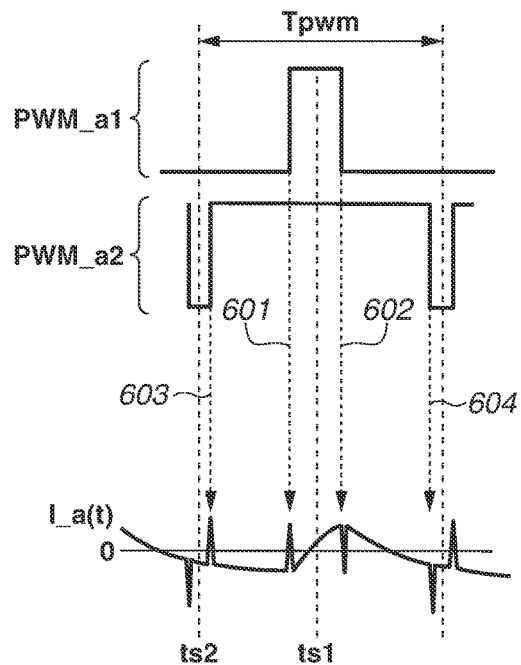

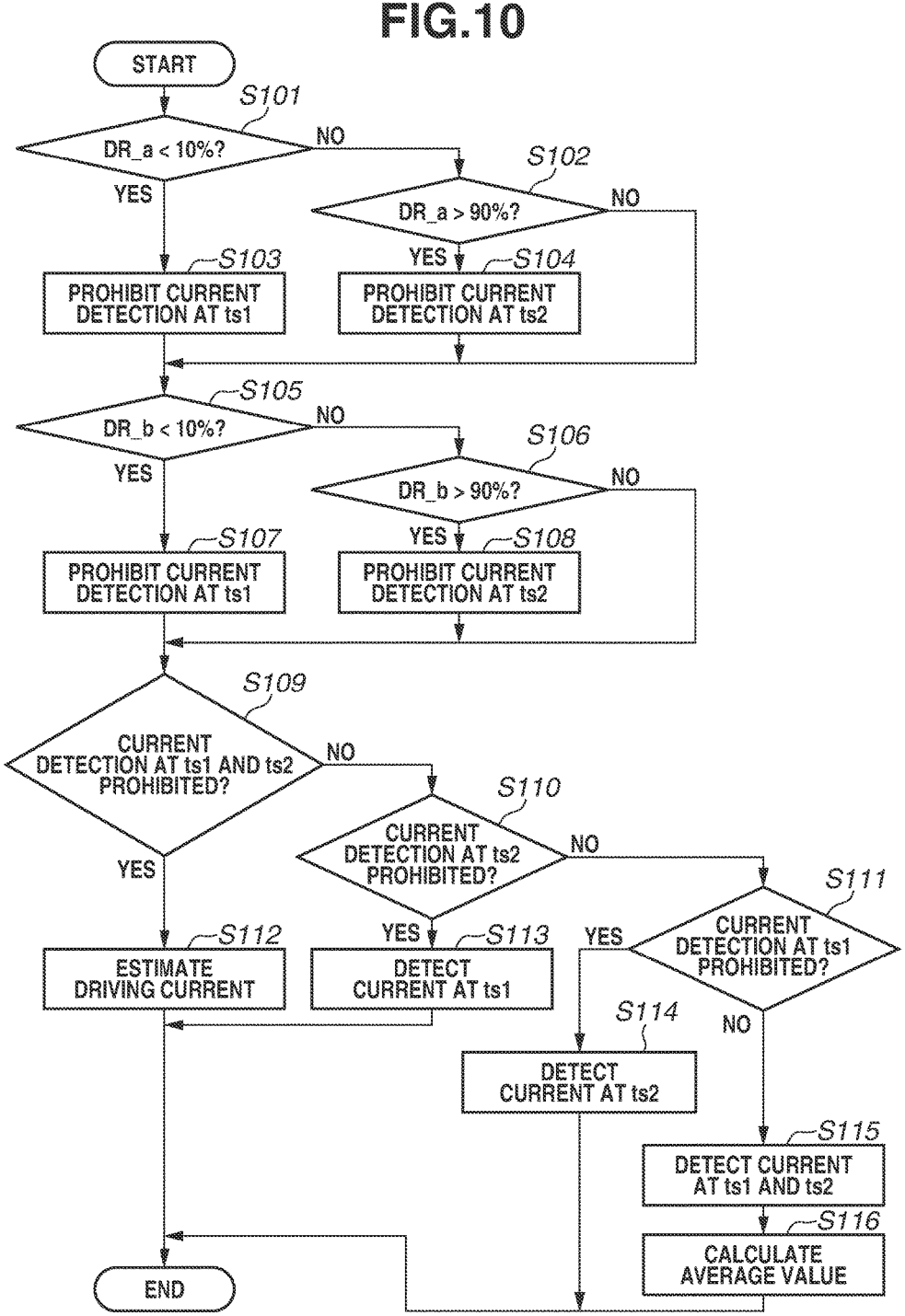

MOTOR CONTROL APPARATUS, SHEET CONVEYING APPARATUS, DOCUMENT FEEDING APPARATUS, DOCUMENT READING APPARATUS, AND IMAGE FORMING APPARATUS

BACKGROUND OF THE INVENTION

Field of the Invention

The disclosed information relates to the motor driving control, especially relates to motor driving control of a stepping motor and the like which can be used as a drive source of a load in an image forming apparatus such as a copy machine and a printer.

Description of the Related Art

Electrophotographic type image forming apparatuses such as copy machines and printers use stepping motors as drive sources in conveyance systems for conveying recording media such as sheets on which images are formed. Speed control of a stepping motor and position (phase) control of the stepping motor can be performed by controlling a pulse period and the number of pulses applied to the motor. When the above-described control is performed, it is necessary to supply a motor with a driving current corresponding to torque which is obtained by adding a predetermined margin to load torque necessary for the motor to rotate so as to prevent the motor from being into a step-out state. Accordingly, there is a possibility that power consumption increases and vibration and noise are generated in the apparatus due to surplus torque.

A method referred to as vector control (or field oriented control (FOC)) is discussed as a technique for dealing with such issues. The vector control is a control method for controlling an amplitude and a phase of a driving current so that appropriate torque is generated in the motor using a rotating coordinate system which defines a magnetic flux direction of a rotor as a d axis and a direction perpendicular to the magnetic flux direction as a q axis. In the rotating coordinate system, a q-axis component (a q-axis current) of the driving current is a torque current component for generating torque contributing to rotation of the rotor, and a d-axis component (a d-axis current) of the driving current is an excitation current component affecting magnetic flux intensity of the rotor. Especially, a motor using a permanent magnet for a rotor as with the stepping motor can perform torque control using only the q-axis current without requiring the d-axis current. Accordingly, the driving control can be realized with excellent power efficiency, and also vibration and noise of the apparatus due to the above-described surplus torque can be suppressed.

The above-described vector control requires to detect a rotation phase of the rotor of the motor. U.S. Pat. No. 8,970,146 describes a method for estimating a phase of a rotor without using a rotary encoder. More specifically, a driving current of the motor is detected, and induced-voltage in an A phase of the motor and induced-voltage in a B phase of the motor are estimated based on the detected driving current. And the phase of the rotor is estimated (determined) based on a ratio between the induced-voltage in the A phase and the induced-voltage in the B phase.

As a driving circuit for driving a motor such as a stepping motor, for example, a full-bridge circuit which includes a plurality of switching elements (field effect transistors (FET)) driven by a pulse width modulation (PWM) signal corresponding to a driving voltage of the motor is used. The full-bridge circuit supplies the motor with the driving current corresponding to the switching of the FET driven by the PWM signal. In order to realize the motor driving control by the above-described vector control, it is necessary to detect the driving current supplied from the such driving circuit to the motor and to estimate (determine) the rotation phase of the rotor.

However, when the driving current is detected at a timing temporally close to a timing at which a PWM signal level changes, a switching noise of the switching element is included in a detected result of the driving current, and an error may be caused in the detected result. When the error is caused in the detected result of the driving current, estimation accuracy of the rotation phase of the rotor may be deteriorated, and trouble may occur in the motor driving control.

SUMMARY OF THE INVENTION

The disclosed information is directed to the provision of a technique for preventing accuracy of detecting a driving current supplied to a motor from being deteriorated due to switching noise of a switching element in a motor control apparatus performing motor driving control by vector control.

According to an aspect of the present invention, a motor control apparatus includes a first driving circuit configured to include a plurality of first switching elements of an H bridge circuit and to be connected to a winding of a first phase of a motor, a second driving circuit configured to include a plurality of second switching elements of the H bridge circuit and to be connected to a winding of a second phase of the motor, a first pulse generator configured to generate a first pulse width modulation (PWM) signal for controlling an ON operation and an OFF operation of the plurality of first switching elements, wherein the first PWM signal is constituted of a signal at a first level which is one of a high level and a low level and a signal at a second level which is another one of the high level and the low level, a second pulse generator configured to generate a second PWM signal for controlling an ON operation and an OFF operation of the plurality of second switching elements, wherein the second PWM signal is constituted of a signal at the first level and a signal at the second level and has a same cycle as that of the first PWM signal, a detector configured to detect a driving current flowing through the winding of the first phase, an estimator configured to estimate the driving current flowing through the winding of the first phase using a current value of a driving current flowing through the winding of the first phase in a past PWM cycle, wherein the PWM cycle is a cycle of the first PWM signal generated by the first pulse generator, and a selector configured to select, at each PWM cycle, whether to detect a driving current flowing through the winding of the first phase at a detection timing predetermined in the PWM cycle or to estimate a driving current flowing through the winding of the first phase using a current value of a driving current flowing through the winding of the first phase in the past PWM cycle based on a first duty ratio which is a duty ratio of the first PWM signal and a relative relationship between a change timing of the high level and the low level in the second PWM signal and the detection timing, wherein the first pulse generator generates the first PWM signal based on a current value of the driving current output from the detector or the estimator.

Further features of the present invention will become apparent from the following description of embodiments with reference to the attached drawings.

BRIEF DESCRIPTION OF THE DRAWINGS

FIGS. 5A, 5B, and 5C illustrate an example of a configuration of a PWM inverter and examples of relationships between an input PWM signal and a driving current in a full-bridge circuit.

FIGS. 7A, 7B, and 7C illustrate examples of detection timings of PWM signals and driving currents.

FIG. 10 is a flowchart illustrating a detection flow of a driving current by the motor control unit.

DESCRIPTION OF THE EMBODIMENTS

Embodiments for implementing the present invention will be described below with reference to the attached drawings. It is noted that the following embodiments are not meant to limit the scope of the present invention as encompassed by the appended claims. Further, not all combinations of features described in the embodiments are essential for solving means of the present invention.

<Image Forming Apparatus>

Figure 1:
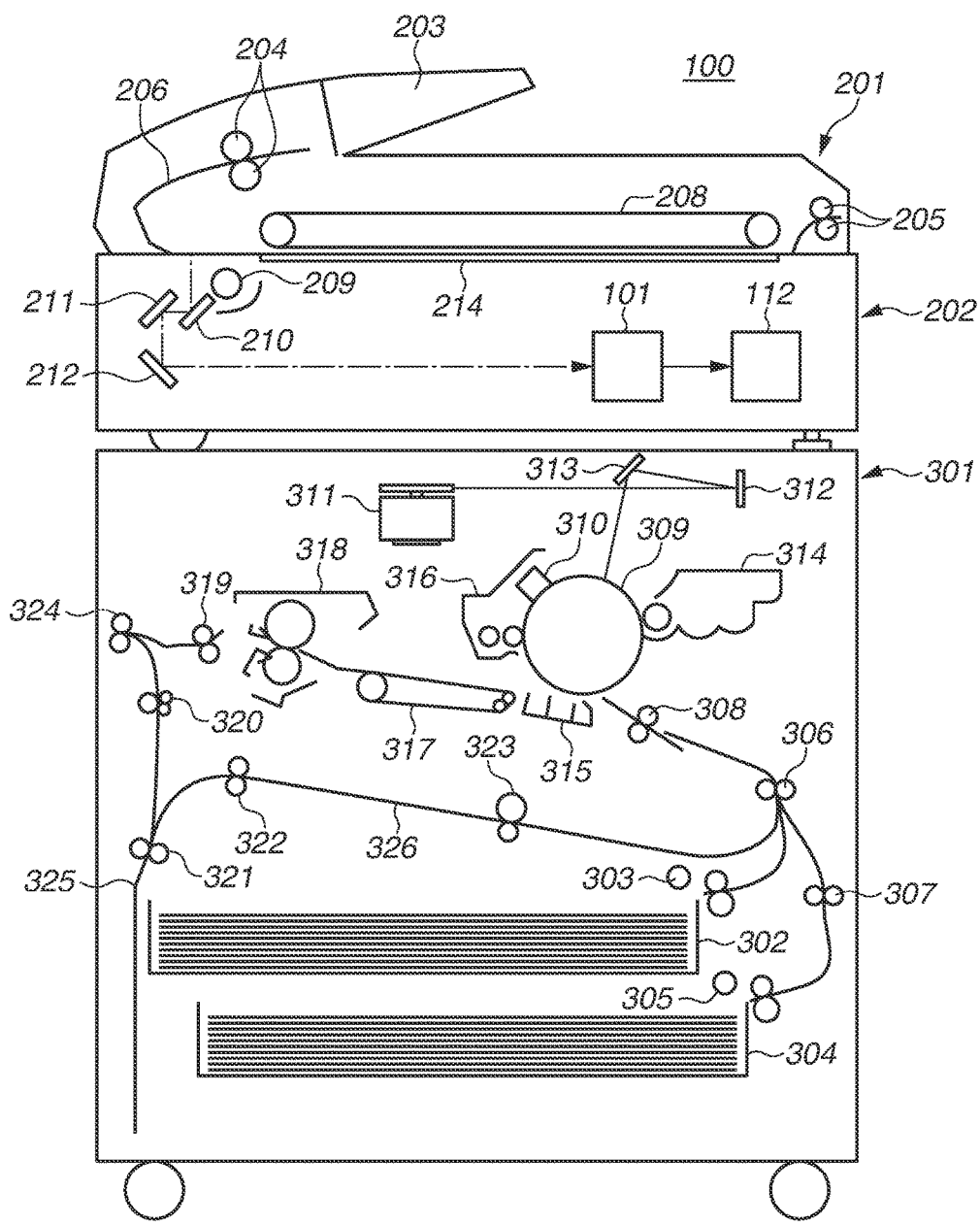
FIG. 1 illustrates an example of an entire configuration of an image forming apparatus.

FIG. 1 is a cross-sectional view of a configuration of an image forming apparatus including a sheet conveying apparatus for conveying sheets, such as a document and a recording paper. First, an example of a configuration of an image forming apparatus in which a motor control apparatus according to the embodiment is installed is described with reference to FIG. 1. An image forming apparatus 100 illustrated in FIG. 1 includes an automatic document feeding apparatus 201, a reading apparatus 202, and an image forming apparatus main body 301. The automatic document feeding apparatus 201 functions as a document feeding apparatus.

A document stacked on a document stacking unit 203 of the automatic document feeding apparatus 201 is fed one by one by a sheet feeding roller 204 and conveyed to a document glass platen 214 of the reading apparatus 202 via a conveyance guide 206. The document is further conveyed at a constant speed by a conveyance belt 208 and discharged to the outside of the apparatus by a sheet discharge roller 205. An illumination system 209 illuminates a document image with light at a reading position of the reading apparatus 202, and the reflected light therefrom is guided to an image reading unit 101 by an optical system constituted of reflection mirrors 210, 211, and 212, and converted into an image signal by the image reading unit 101. The image reading unit 101 is constituted of a lens, a charge coupled device (CCD) as a photoelectric conversion element, a driving circuit of the CCD, and the like. The image signal output from the image reading unit 101 is subjected to various types of correction processing by an image processing unit 112 constituted of a hardware device, such as an application specific integrated circuit (ASIC) and then output to the image forming apparatus main body 301.

Document reading modes include a first reading mode and a second reading mode. The first reading mode is a mode for reading an image on a document conveyed at a constant speed in a state in which the illumination system 209 and the optical system are stopped. The second reading mode is a mode for reading an image on a document placed on a document glass platen 214 by the illumination system 209 and the optical system which move at a constant speed. Generally, an image on a sheet type document is read in the first reading mode, and an image on a bound document is read in the second reading mode.

The image forming apparatus 100 has a copy function for forming an image on a recording sheet (a recording medium) based on the image signal output from the reading apparatus 202. The image forming apparatus 100 also has a print function for forming an image on a recording sheet based on data received from an external apparatus via a network.

The image signal output from the reading apparatus 202 is input to an optical scanning apparatus 311. The optical scanning apparatus 311 includes a semiconductor laser and a polygon mirror and outputs a laser beam (an optical signal) corresponding to the input image signal from the semiconductor laser. The laser beam output from the semiconductor laser illuminates a surface of a photosensitive drum 309 via the polygon mirror and mirrors 312 and 313, and thus the photosensitive drum 309 is exposed to the light. The photosensitive drum 309 of which a surface is uniformly charged by a charging device 310 is exposed to the laser beam, and an electrostatic latent image is formed on the photosensitive drum 309. The electrostatic latent image formed on the photosensitive drum 309 is developed by a toner supplied from a developing unit 314, and a toner image is formed on the photosensitive drum 309. The toner image on the photosensitive drum 309 is moved to a position (a transfer position) facing a transfer and separation device 315 along with rotation of the photosensitive drum 309 and transferred onto a recording sheet by the transfer and separation device 315.

Sheet storage trays 302 and 304 can respectively store different types of recording sheets. For example, the sheet storage tray 302 stores A4 size plain paper, and the sheet storage tray 304 stores A4 size thick paper. The recording sheet stored in the sheet storage tray 302 is fed by a sheet feeding roller 303 on a conveyance path, conveyed by a conveyance roller 306 to a position of a registration roller 308, and temporarily stopped at the position. On the other hand, the recording sheet stored in the sheet storage tray 304 is conveyed by a sheet feeding roller 305 on the conveyance path, conveyed by the conveyance rollers 307 and 306 to the position of the registration roller 308, and temporarily stopped at the position.

The recording sheet conveyed to the position of the registration roller 308 is conveyed by the registration roller 308 to the transfer position according to a timing when the toner image on the photosensitive drum 309 reaches the transfer position. The recording sheet on which the toner image is transferred from the photosensitive drum 309 at the transfer position is conveyed to a fixing unit 318 by a conveyance belt 317. The fixing unit 318 fixes the toner image on the recording sheet to the relevant recording sheet by applying heat and pressure.

When the image formation is performed in a one-sided printing mode, the recording sheet passing through the fixing unit 318 is discharged to the outside of the apparatus by sheet discharge rollers 319 and 324. When the image formation is performed in a two-sided printing mode, the recording sheet of which a front surface (first surface) has an image formed by the fixing unit 318 is conveyed to a reversing path 325 by the sheet discharge roller 319, a conveyance roller 320, and a reversing roller 321. Further, the rotation of the reversing roller 321 is reversed immediately after when a trailing edge of the recording sheet passes through a meeting point of the reversing path 325 and a two-sided path 326, so that the recording sheet is conveyed to an opposite direction to the two-sided path 326. Subsequently, the recording sheet is conveyed to the position of the registration roller 308 by the conveyance rollers 322, 323, and 306 and temporarily stopped at the position. Further, transfer processing of the toner image is performed on a back surface (a second surface) of the recording sheet at the transfer position in the similar manner that of the image formation on the front surface (the first surface) of the recording sheet, and the recording sheet is discharged to the outside of the apparatus after the fixing processing is performed thereon by the fixing unit 318.

When the recording sheet which has been subjected to the image formation on its front surface is conveyed with its face down to the outside of the apparatus, the recording sheet has passed through the fixing unit 318 is temporarily conveyed to a direction not toward the sheet discharge roller 324 but toward the conveyance roller 320. Then, the rotation of the conveyance roller 320 is reversed immediately before the tailing edge of the recording sheet passes through a position of the conveyance roller 320, so that the recording sheet is conveyed to an opposite direction to a direction toward the sheet discharge roller 324. Accordingly, the recording sheet is discharged to the outside of the apparatus by the sheet discharge roller 324 in a state in which front and back of the sheet is reversed.

As described above, the image forming apparatus main body 301 includes the conveyance rollers 306 and 307, the sheet discharge roller 319, the reversing roller 321, the conveyance rollers 322 and 323, and the sheet discharge roller 324 as rollers for conveying a recording sheet on which an image is formed. Further, the rollers such as the sheet feeding roller 303 and the registration roller 308 are rollers for conveying a recording sheet. The driving control of motors for driving these rollers is performed by a motor control unit 157 (FIG. 2) received an instruction from a system controller 151 (FIG. 2) which is described below.

(Control Configuration of Image Forming Apparatus)

Figure 2:
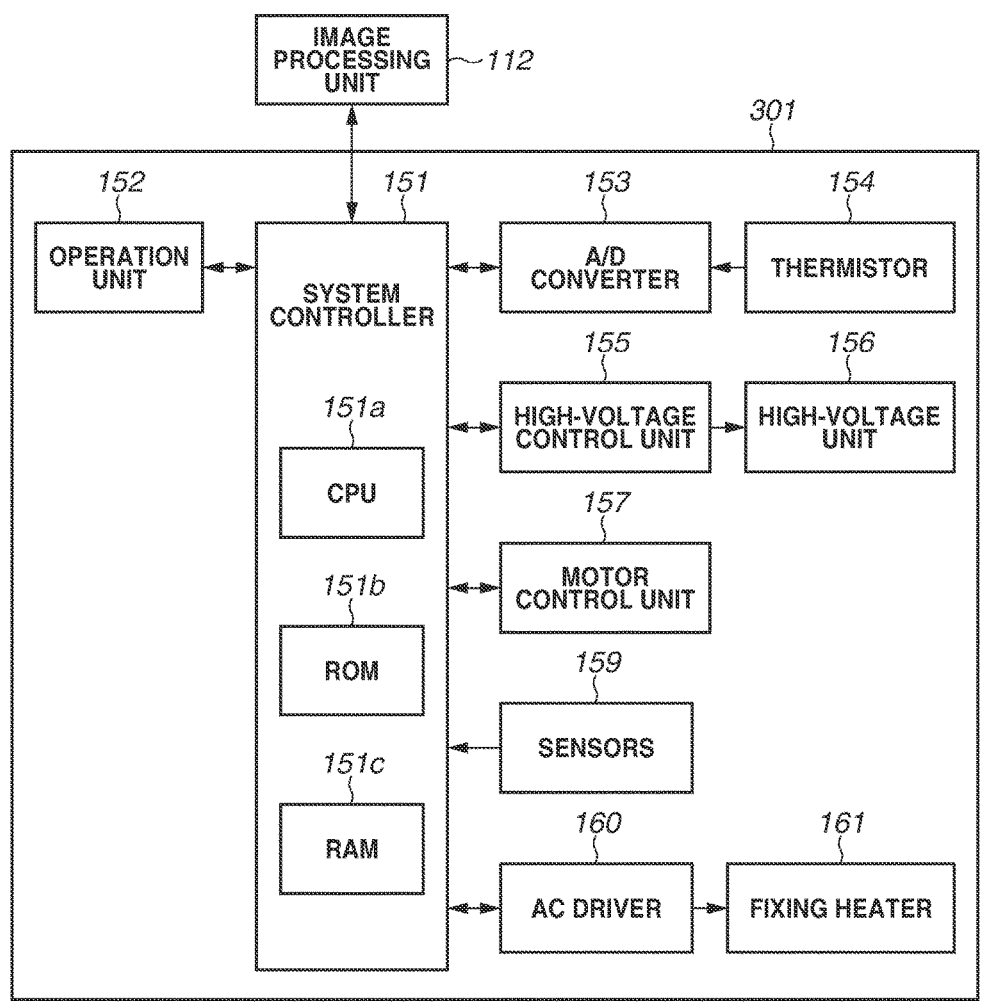
FIG. 2 is a block diagram illustrating an example of a control configuration of the image forming apparatus.

FIG. 2 is a block diagram illustrating an example of a control configuration of the image forming apparatus 100. The system controller 151 illustrated in FIG. 2 includes a central processing unit (CPU) 151a, a read-only memory (ROM) 151b, and a random access memory (RAM) 151c and controls the entire image forming apparatus 100. The system controller 151 is connected to the image processing unit 112, an operation unit 152, analog to digital (A/D) converter 153, a high-voltage control unit 155, the motor control unit 157, sensors 159, and an alternating current (AC) driver 160. The system controller 151 can exchange data between each of the connected units.

The CPU 151a reads and executes various programs stored in the ROM 151b and thus executes various sequences related to predetermined image formation sequences. The RAM 151c is a storage device and is used as a work area for the CPU 151a to execute the various programs and a temporary storage area for temporarily storing various data. The RAM 151c stores data, such as a setting value to the high-voltage control unit 155, a command value to the motor control unit 157, and information received from the operation unit 152.

The system controller 151 controls the operation unit 152 to display an operation screen for a user to perform various settings on a display unit installed in the operation unit 152 and receives a setting from a user via the operation unit 152. The system controller 151 receives information indicating contents set by a user (a setting value of copying magnification, a setting value of density, and the like) from the operation unit 152. The system controller 151 transmits data notifying a user of a state of the image forming apparatus to the operation unit 152. The operation unit 152 displays information indicating the state of the image forming apparatus (for example, the number of image formation sheets, information indicating whether the image formation is in process or not, and information indicating occurrence of a jam and a jam occurrence point) on the display unit based on the data received from the system controller 151.

The system controller 151 (the CPU 151a) transmits to the image processing unit 112 setting value data of each device in the image forming apparatus 100 which are necessary for image processing performed in the image processing unit 112. Further, the system controller 151 receives a signal from each device (signals from the sensors 159) and controls the high-voltage control unit 155 based on the received signal. The high-voltage control unit 155 supplies the charging device 310, the developing unit 314, and the transfer and separation device 315 constituting a high-voltage unit 156 with voltages necessary for respective operations thereof based on setting values output from the system controller 151.

The A/D converter 153 receives a detection signal from a thermistor 154 configured to detect temperature of a fixing heater 161, converts the detection signal into a digital signal, and transmits the digital signal to the system controller 151. The system controller 151 controls the AC driver 160 based on the digital signal received from the A/D converter 153 so that the temperature of the fixing heater 161 reaches desired temperature for the fixing processing. The fixing heater 161 is a heater used for the fixing processing and is included in the fixing unit 318.

As described above, the system controller 151 controls the operation sequences of the image forming apparatus 100. The system controller 151 further controls a driving sequence of each motor via the motor control unit 157. The motor control unit 157 controls the motor (a stepping motor 509 illustrated in FIG. 3) corresponding to a drive source for driving the roller for conveying a recording sheet according to an instruction from the system controller 151. The image forming apparatus 100 includes the motor control units 157 for controlling each motor corresponding to each roller for conveying the recording sheet. According to the present embodiment, the motor control unit 157 is an example of the motor control apparatus for performing the driving control of the motor.

The system controller 151 (the CPU 151a) corresponding to an external controller of the motor control unit 157 generates a command value ($\theta\_ref$) of a phase (a rotation phase) of a rotor of a control target motor (the stepping motor 509) and outputs the command value to the motor control unit 157. For example, a command phase $\theta\_ref$ is a pulse rectangular wave signal, and one pulse corresponds to a minimum change amount of a rotation angle of the stepping motor. A command value of the rotating speed (a command speed ω_ref) of the motor is calculated as a frequency corresponding to the command phase θ_ref. When starting the driving sequence of the motor, the CPU 151a outputs the generated command phase θ_ref to the motor control unit 157 at a predetermined time period (a control period). The motor control unit 157 executes the phase control and the speed control on the motor (the stepping motor 509) according to the command phase input from the CPU 151a.

<Vector Control>

Figure 3:
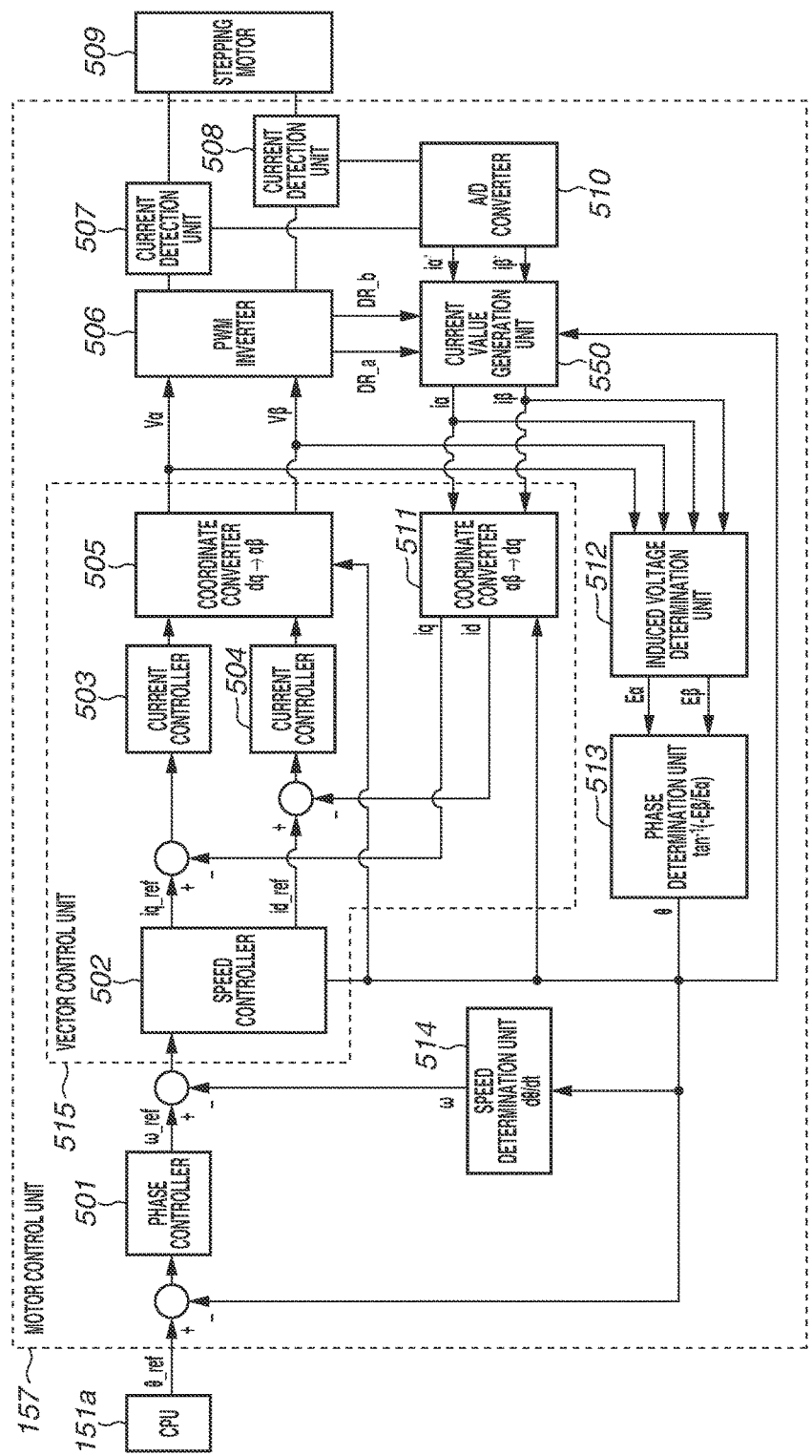
FIG. 3 is a block diagram illustrating an example of a configuration of a motor control unit.

Next, an outline of the vector control of the stepping motor 509 executed by the motor control unit 157 is described with reference to FIGS. 3 and 4. FIG. 3 is a block diagram illustrating an example of a configuration of the motor control unit 157 according to the present embodiment. The motor control unit 157 is constituted of at least one ASIC and executes each function described below. The motor control unit 157 illustrated in FIG. 3 has a basic configuration corresponding to inverter control using coordinate transformation from a stationary coordinate system to a rotating coordinate system which is used in a motor, such as a brushless direct current (DC) motor and an AC servomotor. The stepping motor 509 is a motor including at least two phases and is a two-phase motor including the A phase and the B phase according to the present embodiment.

In the motor control unit 157, a PWM inverter 506 supplies the stepping motor 509 with a driving current according to driving voltages Vα and Vβ of the stepping motor 509 output from a vector control unit 515, and thus the stepping motor 509 is driven. As illustrated in FIG. 3, the vector control unit 515 includes a speed controller 502, current controllers 503 and 504, and coordinate converters 505 and 511.

Figure 4:
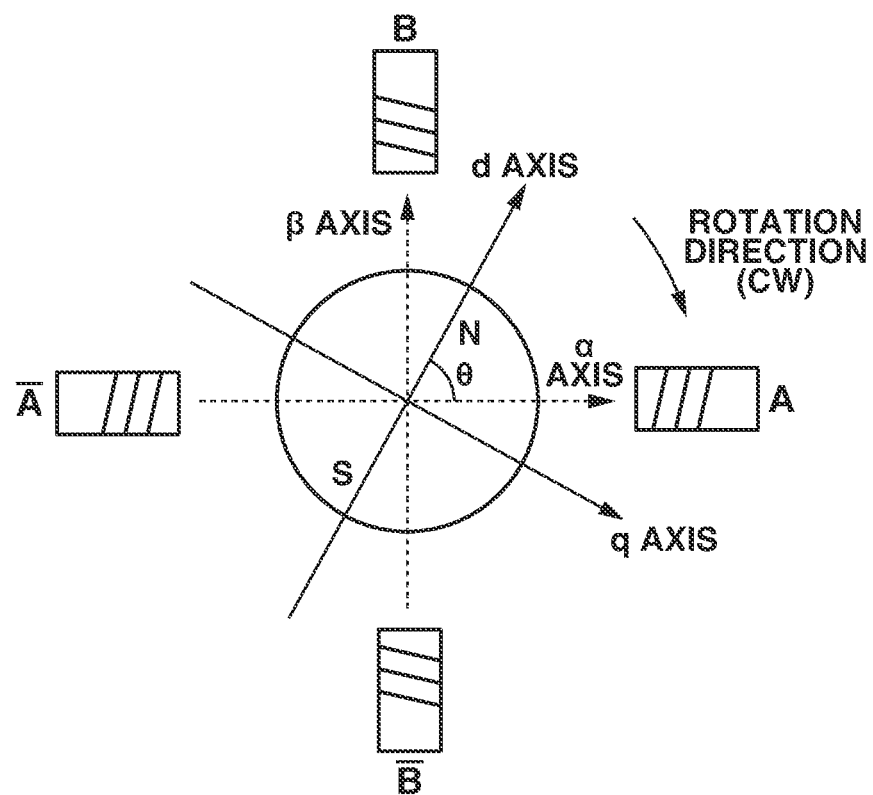
FIG. 4 illustrates a relationship between a motor and dq axes in a rotating coordinate system.

FIG. 4 illustrates a relationship between the two-phase motor including the A phase and the B phase and a d axis and a q axis of the rotating coordinate system. In FIG. 4, axes corresponding to windings of the A phase and the B phase in the stationary coordinate system are respectively defined as an α axis and a β axis. Further, an angle formed by the α axis in the stationary coordinate system and a direction (the d axis) of a magnetic flux generated by a magnetic pole of a permanent magnet used as a rotor is defined as an angle θ. In this case, the rotation phase of the rotor of the stepping motor 509 is expressed by the angle θ. As illustrated in FIG. 4, in the vector control, the rotating coordinate system expressed by the d axis along the magnetic flux direction of the rotor and the q axis along a direction advanced toward 90 degrees from the d axis (perpendicular to the d axis) is used.

The motor control unit 157 performs the vector control which controls the driving current supplied to the stepping motor 509 by a current value of the rotating coordinate system based on the phase θ of the stepping motor 509. In the vector control, current vectors corresponding to the driving currents flowing through the windings of the A phase and the B phase in the stepping motor 509 are converted from the stationary coordinate system expressed by the α axis and the β axis to the rotating coordinate system expressed by the d axis and the q axis. As a result of the coordinate transformation, the driving current supplied to the stepping motor 509 is expressed by the d-axis component (the d-axis current) and the q-axis component (the q-axis current) of the DC current in the rotating coordinate system. In this case, the q-axis current is a current corresponding to the torque current component for generating the torque on the stepping motor 509 and contributing to the rotation of the rotor. The d-axis current corresponds to an excitation current component affecting the magnetic flux intensity of the rotor of the stepping motor 509. The motor control unit 157 individually controls each of the q-axis current and the d-axis current and thus realizes the vector control of the stepping motor 509.

More specifically, the motor control unit 157 estimates (determines) the phase of the stepping motor 509 (the rotor phase) and the rotating speed of the rotor of the stepping motor 509 and performs the vector control based on the estimated result. The motor control unit 157 includes three control loops based on feedback to each of a phase controller 501, a speed controller 502, and current controllers 503 and 504 as illustrated in FIG. 3 and realizes the vector control by these control loops. In the motor control unit 157 illustrated in FIG. 3, estimation of the phase θ of the stepping motor 509 is performed by an induced voltage determination unit 512 and a phase determination unit 513. Further, estimation (determination) of a rotating speed ω of the stepping motor 509 is performed by a speed determination unit 514 based on the estimated value of the phase θ.

In the outermost control loop including the phase controller 501, the phase control of the rotor of the stepping motor 509 is performed based on the feedback of the phase θ of the rotor of the stepping motor 509. The CPU 151a outputs the command phase θ_ref to the motor control unit 157. The phase controller 501 generates and outputs the command speed ω_ref so that a deviation between the phase θ output from the phase determination unit 513 and the command phase θ_ref (a target value) output from the CPU 151a approaches to zero. Thus, the phase control of the stepping motor 509 is performed by the phase controller 501.

In the control loop including the speed controller 502, the speed control of the rotor of the stepping motor 509 is performed based on the feedback of the rotating speed ω of the rotor of the stepping motor 509. The speed controller 502 generates and outputs current command values iq_ref and id_ref so that a deviation between the rotating speed ω output from the speed determination unit 514 and the command speed ω_ref (a target value) output from the phase controller 501 approaches to zero. The current command values iq_ref and id_ref are the current command values in the rotating coordinate system.

In the control loop including the current controllers 503 and 504, the driving current flowing through the winding in each phase in the stepping motor 509 is controlled based on the feedback of the detection value of the driving current flowing through the winding in each phase in the stepping motor 509. Current values iα and iβ of the currents (the AC currents) flowing through the respective windings of the A phase and the B phase in the stepping motor 509 are expressed by the following formulae using the phase θ of the stepping motor 509 in the stationary coordinate system.

$$i\alpha = I^* \cos\theta$$

$$i\beta = I^* \sin\theta \quad (1)$$

The current values id and iq in the rotating coordinate system are expressed by the coordinate transformation (Clarke transformation) indicated in the following formulae.

$$id = \cos\theta^* i\alpha + \sin\theta^* i\beta$$

$$iq = -\sin\theta^* i\alpha + \cos\theta^* i\beta \quad (2)$$

According to the above-described coordinate transformation, the AC current values iα and iβ flowing through the respective windings of the A phase and the B phase in the stationary coordinate system are converted into the DC current values iq and id in the rotating coordinate system. The q-axis current is the torque current component for generating the torque on the stepping motor 509. The d-axis current is the excitation current component affecting the magnetic flux intensity of the rotor of the stepping motor 509 and not contributing to the generation of torque on the stepping motor 509.

The driving currents flowing through the windings of the A phase and the B phase in the stepping motor 509 are respectively detected by current detection units 507 and 508. The detection values of the driving currents detected by the current detection units 507 and 508 are converted from analog values to digital values by an A/D converter 510 and thus can be obtained by the CPU or a programming device such as a field programmable gate array (FPGA). Detected current values iα' and iβ' in the stationary coordinate system output from the A/D converter 510 are input to a current value generation unit 550. A duty ratio DR_a corresponding to the driving voltage Vα and a duty ratio DR_b corresponding to the driving voltage Vβ output from the PWM inverter 506 and the phase θ output from the phase determination unit 513 are input to the current value generation unit 550. The current value generation unit 550 according to the present embodiment generates and outputs the current values iα and iβ based on these input data at every PWM cycle in the PWM inverter 506, which is described below. The current values iα and iβ output from the current value generation unit 550 are input to the coordinate converter 511 and the induced voltage determination unit 512.

The coordinate converter 511 converts the current values iα and iβ in the stationary coordinate system (the αβ axes) into the current values iq and id in the rotating coordinate system (the dq axes) by the formulae (2) and output.

A difference value between the current value iq output from the coordinate converter 511 and the current command value iq_ref output from the speed controller 502 is input to the current controller 503. In addition, a difference value between the current value id output from the coordinate converter 511 and the current command value id_ref output from the speed controller 502 is input to the current controller 504.

The current controller 503 generates a driving voltage Vq in the rotating coordinate system so that the input difference value (i.e., a deviation between the current value iq and the current command value iq_ref) approaches zero and outputs the driving voltage Vq to the coordinate converter 505. The current controller 504 generates a driving voltage Vd in the rotating coordinate system so that the input difference value (i.e., a deviation between the current value id and the current command value id_ref) approaches zero and outputs the driving voltage Vd to the coordinate converter 505. Each of the phase controller 501, the speed controller 502, and the current controllers 503 and 504 is constituted of, for example, a proportional compensator and an integral compensator and realizes feedback control by proportional-integral (PI) control.

The coordinate converter 505 inversely converts the driving voltages Vq and Vd in the rotating coordinate system output from the current controllers 503 and 504 into driving voltages Vα and Vβ in the stationary coordinate system by the following formulae.

$$V\alpha = \cos\theta * Vd - \sin\theta * Vq \quad (3)$$

$$V\beta = \sin\theta * Vd + \cos\theta * Vq$$

The coordinate converter 505 outputs the converted driving voltages Vα and Vβ to the PWM inverter 506 and the induced voltage determination unit 512 constituted of the full-bridge circuits.

As described above, the vector control unit 515 performs the vector control for controlling the driving current to be supplied to the winding of each phase in the stepping motor 509 by the current value of the rotating coordinate system (the dq axes) based on the phase θ of the stepping motor 509. According to the present embodiment, the phase θ of the stepping motor 509 is determined based on the detected result of the driving current flowing through the winding of each phase in the stepping motor, as described below. The vector control unit 515 outputs the driving voltages Vα and Vβ corresponding to the driving current supplied to the stepping motor 509 as a result of the vector control based on feedback of an estimation value of the phase θ of the stepping motor 509. In the vector control, the d-axis current which does not contribute to generation of torque of the stepping motor 509 is generally controlled to be zero. In other words, the current command value id_ref is set to zero in the vector control unit 515.

In the PWM inverter 506, full-bridge circuits 530a and 530b (FIGS. 5A, 5B, and 5C) are driven by the driving voltages Vα and Vβ output from the coordinate converter 505. Accordingly, the PWM inverter 506 drives the stepping motor 509 by supplying the winding of each phase in the stepping motor 509 with the driving current corresponding to the driving voltages Vα and Vβ.

<Sensorless Control>

As described above, in the vector control, feedback of information pieces indicating the phase of the rotor of the motor and the rotating speed of the rotor of the motor is required to perform the phase control and the speed control of the motor. More specifically, in the configuration illustrated in FIG. 3, phase information indicating the phase θ of the rotor of the stepping motor 509 and speed information indicating the rotating speed ω of the rotor of the stepping motor 509 are required to be respectively fed back to the phase controller 501 and the speed controller 502.

Generally, a rotary encoder may be attached to a rotary shaft of the motor to detect (estimate) the phase of the rotor of the motor and the rotating speed of the rotor of the motor. The phase is detected based on the number of pulses output from the encoder, and the rotating speed is detected based on the period of the pulses output from the encoder. However, attaching the encoder to the rotary shaft causes issues of cost increase and securing of an installation space. Thus, sensorless control in which the phase of the rotor of the motor and the rotating speed of the rotor of the motor are estimated without using a sensor like the encoder and the vector control is performed based on the estimated result is discussed. The sensorless control of the stepping motor 509 is described below with reference to FIG. 3.

First, the induced voltage determination unit 512 calculates (determines) an induced voltage (counter electromotive voltage) induced in each of the windings of the A phase (a first phase) and the B phase (a second phase) by the rotation of the rotor of the stepping motor 509. More specifically, the induced voltage determination unit 512 calculates induced voltages Eα and Eβ induced in the winding of the A phase and the winding of the B phase based on the current values iα and iβ output from the current value generation unit 550 and the driving voltages Vα and Vβ output from the vector control unit 515 using the following voltage equations.

$$E\alpha = V\alpha - R * i\alpha - L * di\alpha/dt \quad (4)$$

$$E\beta = V\beta - R * i\beta - L * di\beta/dt$$

Here, R is a winding resistance, and L is a winding inductance. Values of the winding resistance R and the winding inductance L are specific to the stepping motor being used and are stored in advance in the ROM 151b or a memory which is installed in the motor control unit 157 and is not illustrated.

The induced voltages Eα and Eβ calculated by the induced voltage determination unit 512 are input to the phase determination unit 513. The phase determination unit 513 calculates (determines) the phase θ of the stepping motor 509 based on a ratio of the induced voltage Eα of the A phase and the induced voltage Eβ of the B phase using the following formula.

$$\theta = \tan^{-1}(-E\beta/E\alpha) \qquad (5)$$

The phase determination unit 513 outputs (feeds back) the phase θ obtained by the above-described calculation to the phase controller 501 and the speed determination unit 514. The phase θ is also fed back from the phase determination unit 513 to the coordinate converters 505 and 511 and used in coordinate transformation.

When an actual rotation phase θm (a mechanical angle) of the rotor of the stepping motor 509 does not correspond one-to-one with the estimated rotation phase θ (an electrical angle), a converter for converting the electrical angle θ into the mechanical angle θm may be installed between the phase determination unit 513 and the phase controller 501. In this case, the phase θ of the stepping motor 509 is converted into the actual rotation phase θm (the mechanical angle) by the such converter and then fed back to the phase controller 501.

The speed determination unit 514 calculates (determines) the rotating speed ω of the rotor of the stepping motor 509 based on the phase θ output from the phase determination unit 513 using the following formula.

$$\omega = d\theta/dt \qquad (6)$$

As shown in the formula (6), the rotating speed ω is calculated based on a variation of the phase θ in a predetermined time. The speed determination unit 514 outputs (feeds back) the obtained rotating speed ω to the speed controller 502.

<PWM Inverter and Current Detection Unit>

Figure 5A:
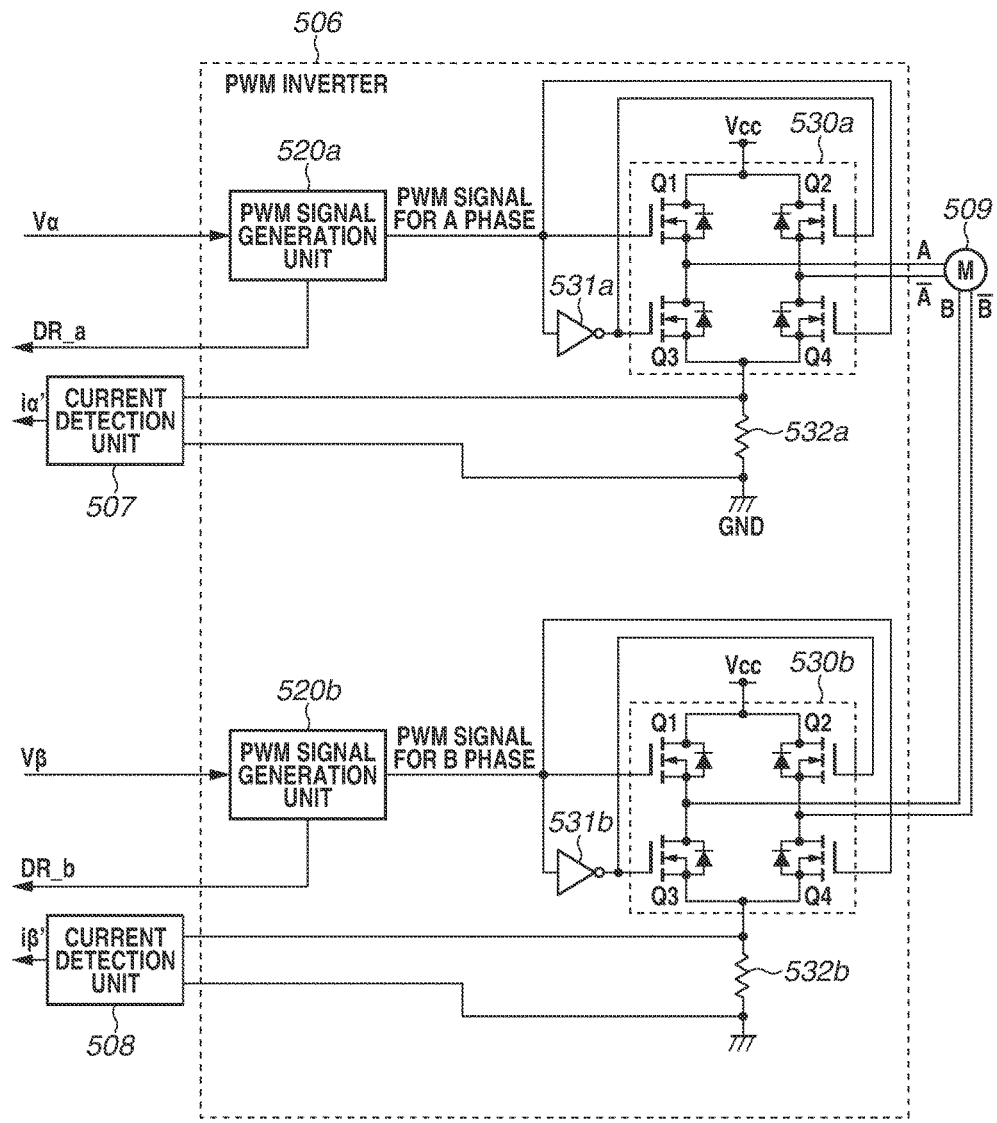

Next, the outline of the configuration and operations of the PWM inverter 506 is described with reference to FIG. 5A. The PWM inverter 506 includes the full-bridge circuits (H bridge circuits) as many as the number of phases (two phases in the present embodiment) of the stepping motor 509 as the driving circuits of the stepping motor 509 as a driving target. According to the present embodiment, the PWM inverter 506 includes the full-bridge circuits 530a and 530b corresponding to the A phase and the B phase in the stepping motor 509 as illustrated in FIG. 5A. The PWM inverter 506 further includes a PWM signal generation unit 520a, an inverter 531a, and a shunt resistor 532a corresponding to the A phase and a PWM signal generation unit 520b, an inverter 531b, and a shunt resistor 532b corresponding to the B phase.

The driving voltages Vα and Vβ output from the vector control unit 515 are input to the PWM inverter 506. The PWM inverter 506 causes the PWM signal generation unit 520a to generate a PWM signal for the A phase corresponding to the driving voltage Vα and causes the PWM signal generation unit 520b to generate a PWM signal for the B phase corresponding to the driving voltage Vβ. Further, the PWM inverter 506 drives the full-bridge circuits 530a and 530b respectively by the PWM signals for the A phase and the B phase and thus supplies the driving currents to the windings of the A phase and the B phase in the stepping motor 509. As described above, the PWM inverter 506 drives the stepping motor 509 by respectively supplying the driving currents to the windings of the A phase and the B phase in the stepping motor 509 according to the driving voltages Vα and Vβ. The configuration and operations of the driving circuit corresponding to the A phase when the driving current corresponding to the driving voltage Vα is supplied to the winding of the A phase in the stepping motor 509 are mainly described below, however, the same can be applied to the configuration and operations of the driving circuit corresponding to the B phase.

The full-bridge circuit 530a includes FETs (switching elements) Q1 and Q2 on a high potential side (a high side) close to a power source (a power source voltage Vcc) and FETs (switching elements) Q3 and Q4 on a low potential side (a low side) close to a ground (GND). More specifically, the full-bridge circuit 530a includes the FETs Q1 to Q4 constituting the H bridge circuit. The shunt resistor 532a is connected between the full-bridge circuit 530a and the GND as a current detection element (a current detection resistor) for detecting the driving current flowing through the winding of the A phase.

More specifically, the full-bridge circuit 530a includes the FETs Q1 and Q3 which are connected in series between the power source Vcc and the shunt resistor 532a. The full-bridge circuit 530a further includes the FETs Q2 and Q4 which are connected in series between the power source and the shunt resistor 532a and connected in parallel with the FETs Q1 and Q3. The winding of the A phase in the stepping motor 509 is connected between a connection point of the FETs Q1 and Q3 and a connection point of the FETs Q2 and Q4 so as to bridge these two connection points. According to the present embodiment, N-channel FETs are used as the FETs Q1 to Q4. Drain terminals of the FETs Q1 and Q2 are connected to the power source. Further, source terminals of the FETs Q3 and Q4 are connected to the GND via the shunt resistor 532a.

The PWM signal generation unit 520a generates and outputs a PWM signal having a duty ratio DR_a corresponding to the driving voltage Vα for every cycle (a PWM cycle) in generation of the PWM signal (PWM control). The PWM signal generation unit 520a compares, for example, a modulation wave (the driving voltages Vα and Vβ according to the present embodiment) with a triangular wave (carrier) and thus generates a PWM signal based on a triangular-wave comparison method for generating a PWM signal. A high level (H-level) signal is generated when a modulation wave value (Vα) is greater than or equal to a triangular wave value, and a low level (L-level) signal is generated when the modulation wave value (Vα) is less than the triangular wave value. The duty ratio of the PWM signal is a proportion of an H-level period to one period of the PWM signal. As described above, the PWM signal generation unit 520a generates the PWM signal which changes between the H level and the L level for switching the FETs Q1 to Q4 in the full-bridge circuit 530a based on the driving voltage Vα. The PWM signal generation unit 520b generates the PWM signal based on the driving voltage Vβ in the similar manner. According to the present embodiment, the PWM signal generation unit is individually provided in each of the A phase and the B phase as illustrated in FIG. 5A, however, the PWM signal generation unit in the A phase and the PWM signal generation unit in the B phase may a common one. More specifically, one PWM signal generation unit may generate the PWM signal for the A phase and the PWM signal for the B phase and output them.

The PWM signal output from the PWM signal generation unit 520a is input to the FETs Q1 and Q4 of the full-bridge circuit 530a and the inverter 531a. The inverter 531a inverts the level of the input PWM signal between the H level and the L level and generates and outputs a signal in which the H level and the L level are inverted (an inverted PWM signal). The inverted PWM signal output from the inverter 531a is input to the FETs Q2 and Q3 of the full-bridge circuit 530a. In the full-bridge circuit 530a, the FETs Q1 to Q4 are respectively switched (a switching operation of an ON-state and an OFF-state by a signal input to the gate is performed) by the PWM signal or the inverted PWM signal input to the respective gates of the FETs Q1 to Q4.

More specifically, when the PWM signal input to the gate is at the H level, the FETs Q1 to Q4 become the ON-state, and the current flows through between a drain and a source. On the other hand, when the PWM signal input to the gate is at the L level, the FETs Q1 to Q4 become the OFF-state, and the current does not flow through between the drain and the source. The above-described switching is performed on the FETs Q1 and Q4 by the PWM signal output from the PWM signal generation unit 520a. On the other hand, the above-described switching is performed on the FETs Q2 and Q3 by the inverted PWM signal output from the inverter 531a. Thus, when the FETs Q1 and Q4 are in the ON-state, the FETs Q2 and Q3 are in the OFF-state, and when the FETs Q1 and Q4 are in the OFF-state, the FETs Q2 and Q3 are in the ON-state.

As described above, the PWM signal generation unit 520a generates the PWM signal having the duty ratio DR_a corresponding to the driving voltage Vα. The full-bridge circuit 530a supplies the driving current to the winding of the A phase in the stepping motor 509 in response to the switching of the FETs Q1 to Q4 by the relevant PWM signal. Thus, the driving current flowing through the winding of the A phase is changed every the PWM cycle in response to the duty ratio DR_a of the PWM signal generated by the PWM signal generation unit 520a. Accordingly, the driving current corresponding to the driving voltage Vα is supplied from the full-bridge circuit 530a to the winding of the A phase in the stepping motor 509. Similarly, the driving current corresponding to the driving voltage Vβ is supplied from the full-bridge circuit 530b to the winding of the B phase in the stepping motor 509.

The current detection unit 507 detects a voltage generated in the shunt resistor 532a (i.e., a potential difference between both ends of the shunt resistor 532a) to detect the driving current flowing through the winding of the A phase in the stepping motor 509 and outputs the detected value iα'. Further, the current detection unit 508 detects a voltage generated in the shunt resistor 532b to detect the driving current flowing through the winding of the B phase in the stepping motor 509 and outputs the detected value iβ'. The detected current values iα' and iβ' output from the current detection units 507 and 508 are input to the A/D converter 510 and subjected to A/D conversion as described above. The detected current values iα' and iβ' after the A/D conversion are input to the current value generation unit 550.

FIGS. 5B and 5C illustrate examples of relationships of the PWM signal input to the full-bridge circuit 530a and the driving current flowing through the winding of the A phase in the stepping motor 509. FIG. 5B illustrates the example when the PWM signal is at the H level (the inverted PWM signal is at the L level), and the driving current flows to a direction from the power source to the GND. FIG. 5C illustrates the example when the PWM signal is at the L level (the inverted PWM signal is at the H level), and the driving current flows to a direction from the GND to the power source. Further, FIGS. 5B and 5C both illustrate the example when the driving current flowing through the winding of the A phase in the stepping motor 509 flows in a direction from the connection point of the FETs Q1 and Q3 to the connection point of the FETs Q2 and Q4.

As illustrated in FIGS. 5B and 5C, even if the direction that the driving current flows through the winding in the stepping motor 509 is the same when the PWM signal is at the H level and when at the L level, different phenomena occur in the shunt resistor 532a. Thus, the current detection unit 507 performs processing for switching (reversing) the positive or negative polarity of the detected value as necessary so that the positive or negative polarity of the detected value corresponding to the voltage generated in the shunt resistor 532a matches the positive or negative polarity of the driving current flowing through the winding in the stepping motor 509.

<Detection Timing of Driving Current>

The current value generation unit 550 according to the present embodiment (FIG. 3 and FIG. 8) respectively samples the current detected values iα' and iβ' after the A/D conversion output from the current detection units 507 and 508. Further, the current value generation unit 550 generates the current values iα and iβ every PWM cycle Tpwm based on obtained sample values. The current value generation unit 550 detects the driving current (i.e., samples of the current detected values iα' and iβ') at a detection timing in the PWM cycle determined in advance every PWM cycle Tpwm. The detection timing at which the driving current is detected is described below. The detection timing in the A phase in the stepping motor 509 is described blow, however, the same configuration can be applied to the detection timing in the B phase.

Figure 6:
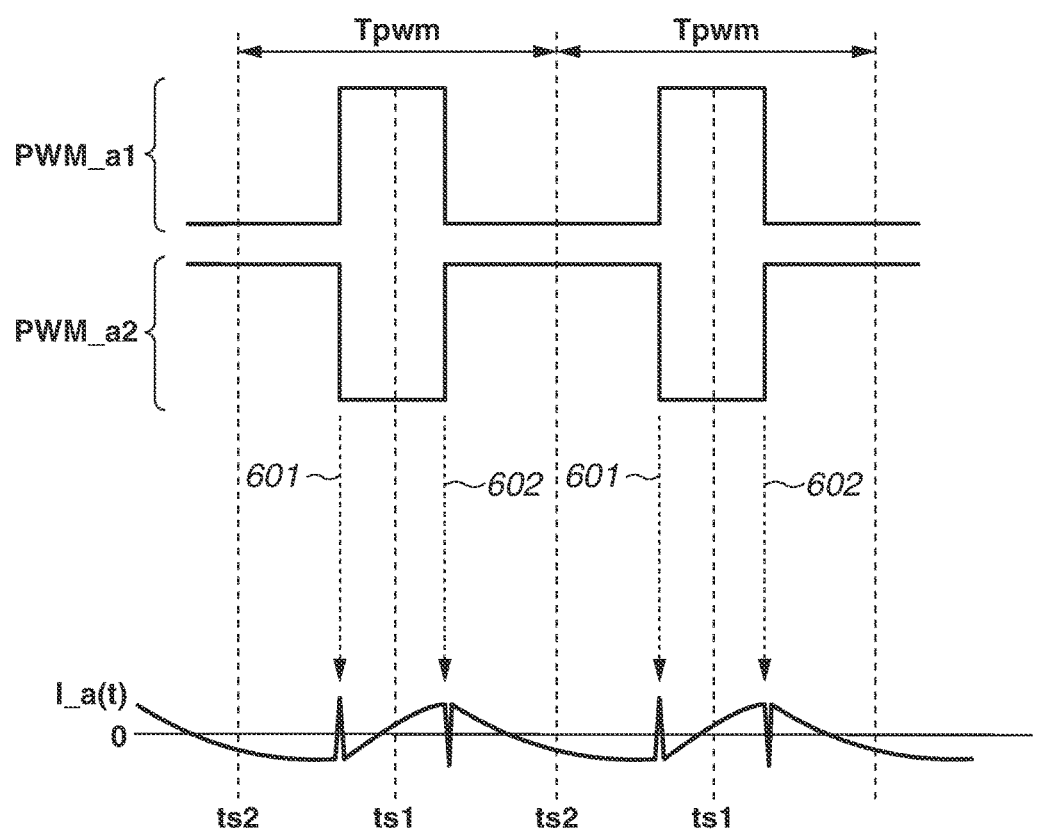
FIG. 6 illustrates an example of detection timings of PWM signals and a driving current.

FIG. 6 illustrates examples of waveforms of the PWM signal (PWM_a1) and the inverted PWM signal (PWM_a2) input to the full-bridge circuit 530a corresponding to the A phase and a waveform of a driving current I_a(t) flowing through the winding of the A phase in the stepping motor 509. In FIG. 6, I_a(t)>0 corresponds to a case when the driving current flows through the winding of the A phase in the stepping motor 509 to directions of arrows illustrated in FIGS. 5B and 5C. The PWM signal is generally generated so that a period of the H level (referred to as a "H period" in below) and a period of the L level (referred to as a "L period" in below) are alternately arranged. The PWM signal generated by the PWM signal generation unit 520a according to the present embodiment is formed in such a manner that the H period is arranged in a center part of the PWM cycle Tpwm and the waveform is symmetrical to a central timing of the PWM cycle Tpwm (center growth) as illustrated in FIG. 6. As an example according to the present embodiment, a central timing of a period during which the PWM signal is at the L level (the inverted PWM signal is at the H level) is defined as a start timing of the PWM cycle Tpwm. An example is described below in which the detection timing of the driving current is determined in advance to a start timing ts2 and a center timing ts1 in the PWM cycle Tpwm. The central timing in the PWM cycle Tpwm corresponds to a timing of a half cycle Tpwm/2 of the PWM cycle.

The current value generation unit 550 according to the present embodiment basically detects the driving current (samples the current detected values iα' and iβ') at least either of the timings ts1 and ts2 every PWM cycle Tpwm. However, as illustrated in FIG. 6, at timings 601 and 602 at which the level of the PWM signal generated by the PWM signal generation unit 520a is changed between the H level and the L level, switching noise may be generated in the driving current I_a(t). In order to prevent such switching noise from being included in the detection result, it is necessary to detect the driving current while avoiding a timing temporally close to the timings 601 and 602 at which the level of the PWM signal is changed.

The timings 601 and 602 at which the level of the PWM signal is changed are determined by the duty ratio DR_a of the PWM signal. For example, as illustrated in FIG. 7A, when the duty ratio DR_a is small, the switching noise is generated in the driving current I_a(t) near the central timing in the PWM cycle Tpwm. On the other hand, as illustrated in FIG. 7B, when the duty ratio DR_a is large, the switching noise is generated in the driving current I_a(t) near the start timing of the PWM cycle Tpwm (and the start timing of the next PWM cycle).

Thus, the current value generation unit 550 according to the present embodiment prohibits detection of the driving current at a timing affected by the switching noise in the timings ts1 and ts2 based on the duty ratio DR_a of the PWM signal. For example, when the duty ratio DR_a is less than a first threshold value, the current value generation unit 550 prohibits the detection of the driving current at the timing ts1, and when the duty ratio DR_a is greater than a second threshold value, the current value generation unit 550 prohibits the detection of the driving current at the timing ts2. The second threshold value is set to a value greater than the first threshold value. According to the present embodiment, the first threshold value and the second threshold value are respectively set to 10% and 90% as an example. When the detection of the driving current at the start timing ts2 in the current PWM cycle Tpwm is prohibited based on the duty ratio DR_a, the detection of the driving current at the start timing in the next PWM cycle may be prohibited together. This is because when the duty ratio DR_a is large, the switching noise is generated in the driving current I_a(t) near the start timing of the next PWM cycle as illustrated in FIG. 7B.

When the first threshold value and the second threshold value are used as described above, the current value generation unit 550 is operated so as to detect the driving current at both of the timings ts1 and ts2 if the first threshold value<the duty ratio DR_a<the second threshold value is satisfied. When the detection of the driving current (sampling of the current detected value iα') is performed at both of the timings ts1 and ts2, the current value generation unit 550 may generate the current value iα from an average of the obtained sample values. As a modification, the current value generation unit 550 may operate to prohibit the detection of the driving current at either of the timings ts1 and ts2 by a comparison of a threshold value set at 50% and the duty ratio DR_a.

As described above, the current value generation unit 550 performs prohibition processing for determining whether to prohibit the detection of the driving current or not based on a relative relationship between the detection timings ts1 and ts2 of the driving current and a timing at which the level of the PWM signal is changed every PWM cycle Tpwm. The timing at which the level of the PWM signal is changed is determined by the duty ratio DR_a of the PWM signal as described above. In the prohibition processing as described above, the detection of the driving current may be prohibited at both of the timings ts1 and ts2 in the PWM cycle Tpwm. Thus, when the detection of the driving current is prohibited at both of the timings ts1 and ts2 in the PWM cycle Tpwm based on the duty ratio DR_a of the PWM signal, the current value generation unit 550 according to the present embodiment estimates the driving current in the relevant PWM cycle. The estimation of the driving current can be performed using the current values iα and iβ generated in the past PWM cycle which is described below.

Thus, the current value generation unit 550 according to the present embodiment selects whether to detect the driving current at the detection timings ts1 and ts2 in the relevant PWM cycle or to estimate the driving current based on the duty ratio DR_a of the PWM signal for each PWM cycle Tpwm. More specifically, the current value generation unit 550 selects to detect the driving current when the detection of the driving current is not prohibited at least either of the detection timings ts1 and ts2 for each PWM cycle Tpwm. On the other hand, the current value generation unit 550 selects to estimate the driving current when the detection of the driving current is prohibited both of the detection timings ts1 and ts2 for each PWM cycle Tpwm.

By the above-described processing, the current value generation unit 550 can prevent deterioration of the detection accuracy of the driving current due to the switching noise generated in the driving current I_a(t) by the change in the level of the PWM signal. According to the present embodiment, the processing on the driving current I_a(t) based on the duty ratio DR_a of the PWM signal corresponding to the A phase is described, however, the same processing may be performed on the driving current I_b(t) based on the duty ratio DR_b of the PWM signal corresponding to the B phase. Accordingly, deterioration of the detection accuracy of the driving current due to switching noise generated in the driving current I_b(t) can be prevented.

In this regard, in the driving current I_a(t) corresponding to the A phase, not only the switching noise due to the change in the level of the PWM signal corresponding to the A phase but also the switching noise due to the change in the level of the PWM signal corresponding to the B phase may be generated. In the example illustrated in FIG. 7C, the switching noise are generated in the driving current I_a(t) at the timings 601 and 602 at which the level of the PWM signal corresponding to the A phase is changed. Further, the switching noise are also generated in the driving current I_a(t) at timings 603 and 604 at which the level of the PWM signal corresponding to the B phase is changed. Similar switching noise is also generated in the driving current I_b(t) corresponding to the B phase at the timings 601 to 604.

Thus, according to the present embodiment, it may be determined whether to prohibit the detection of the driving currents I_a(t) and I_b(t) or not based on both of the duty ratio DR_a of the PWM signal corresponding to the A phase and the duty ratio DR_b of the PWM signal corresponding to the B phase. Accordingly, deterioration of the detection accuracy of the driving current due to the switching noise generated in the driving currents I_a(t) and I_b(t) by the change in the level of the PWM signal in both of the A phase and the B phase can be prevented. Examples of the prohibition processing are illustrated in FIG. 8 and FIG. 10 which are described below.

<Configuration of Current Value Generation Unit>

Figure 8:
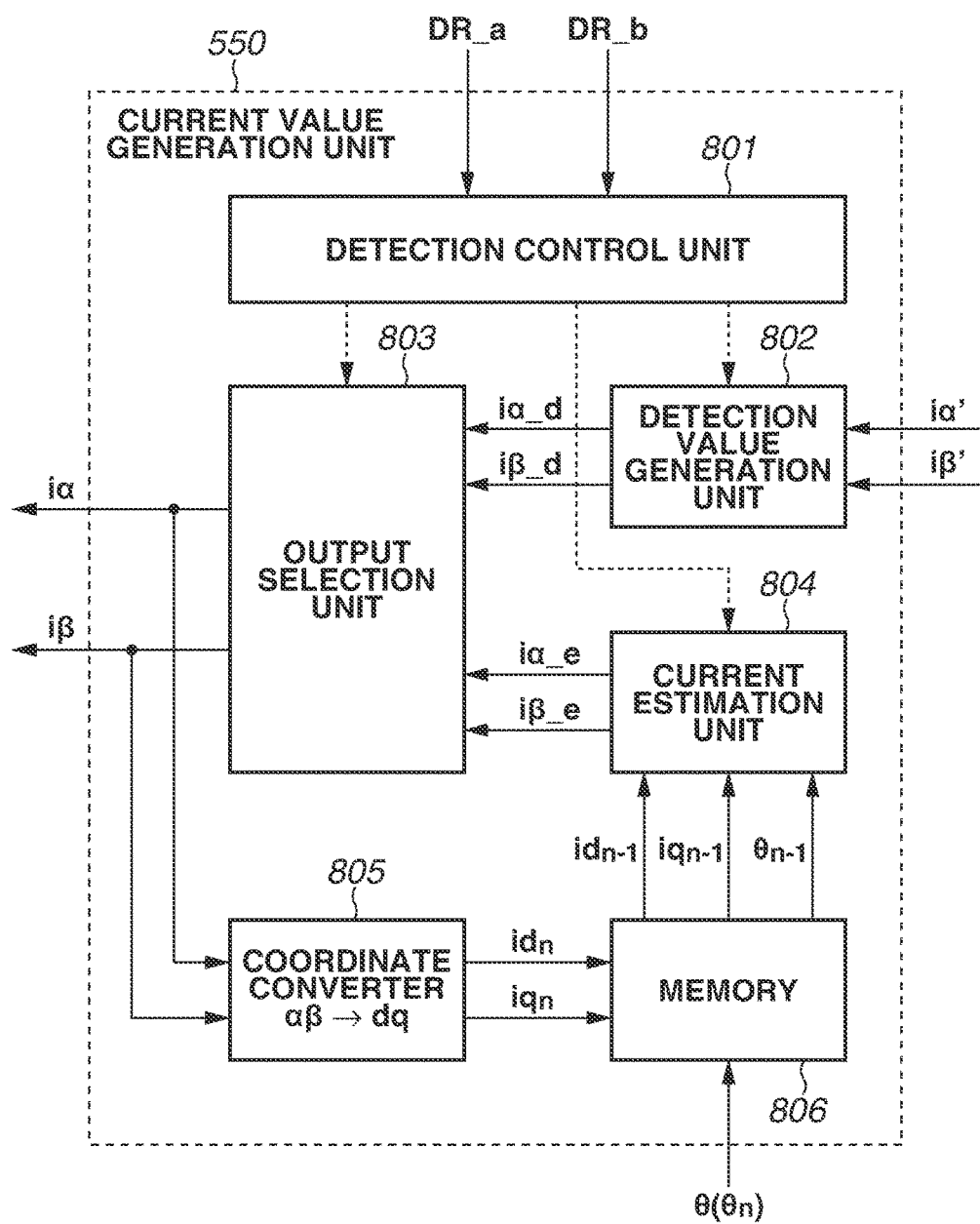
FIG. 8 is a block diagram illustrating an example of a configuration of a current value generation unit.

FIG. 8 is a block diagram illustrating an example of a configuration of the current value generation unit 550 according to the present embodiment. The duty ratios DR_a and DR_b respectively corresponding to the driving voltages Vα and Vβ output from the PWM inverter 506 and the current detected values iα' and iβ' output from the A/D converter 510 are input to the current value generation unit 550. The phase θ output from the phase determination unit 513 is further input to the current value generation unit 550 as the phase $\theta_n$ and stored in a memory 806.

In the current value generation unit 550, a detection control unit 801 determines, at each PWM cycle Tpwm, whether to prohibit the detection of the driving current for each of the detection timings ts1 and ts2 of the driving current based on the input duty ratios DR_a and DR_b. Further, the detection control unit 801 selects whether to detect the driving current corresponding to the A phase and the B phase or to estimate the driving current corresponding to the A phase and the B phase according to the determination result and controls a detection value generation unit 802, a current estimation unit 804, and an output selection unit 803.

More specifically, when the detection of the driving current is prohibited at either one of the detection timings ts1 and ts2, the detection control unit 801 controls the detection value generation unit 802 to detect the driving current at the timing which is not prohibited in the detection timings ts1 and ts2. Further, the detection control unit 801 controls the current estimation unit 804 not to estimate the driving current. When the detection of the driving current is not prohibited at both of the detection timings ts1 and ts2, the detection control unit 801 controls the detection value generation unit 802 to detect the driving current at both of the detection timings ts1 and ts2. Further, the detection control unit 801 controls the current estimation unit 804 not to estimate the driving current.

Accordingly, the detection value generation unit 802 detects the driving current (performs sampling of the current detected values $i\alpha'$ and $i\beta'$) at the detection timing not prohibited by the detection control unit 801 and generates the current values $i\alpha\_d$ and $i\beta\_d$. When sampling of the current detected values $i\alpha'$ and $i\beta'$ is performed at both of the timings ts1 and ts2, the detection value generation unit 802 generates an average value of the obtained sample values as the current values $i\alpha\_d$ and $i\beta\_d$.

On the other hand, when the detection of the driving current is prohibited at both of the detection timings ts1 and ts2, the detection control unit 801 controls the current estimation unit 804 to estimate the driving current and controls the detection value generation unit 802 not to detect the driving current. In this case, the current estimation unit 804 estimates the driving current by estimation calculation based on the current value generated in the PWM cycle immediately before and a variation of the phase θ in the PWM cycle Tpwm by the rotation of the stepping motor 509, which is described below. The current estimation unit 804 generates the current values $i\alpha\_e$ and $i\beta\_e$ as estimation values of the driving current.

The output selection unit 803 selectively outputs the current values $i\alpha\_d$ and $i\beta\_d$ generated by the detection value generation unit 802 or the current values $i\alpha\_e$ and $i\beta\_e$ generated by the current estimation unit 804 as the current values $i\alpha$ and $i\beta$ according to an instruction from the detection control unit 801. The current values $i\alpha$ and $i\beta$ output from the output selection unit 803 are transmitted to the coordinate converter 511 and the induced voltage determination unit 512 and also fed back to a coordinate converter 805. The coordinate converter 805 converts the current values $i\alpha$ and $i\beta$ in the stationary coordinate system (the $i\alpha$ axes) into current values $iq_n$ and $id_n$ in the rotating coordinate system (the dq axes) and outputs the current values $iq_n$ and $id_n$ to the memory 806. In this regard, the current values iq and id output from the coordinate converter 511 may be fed back to the current value generation unit 550 and stored in the memory 806 as the current values $iq_n$ and $id_n$ without providing the coordinate converter 805 in the current value generation unit 550.

The current estimation unit 804 performs estimation calculation of the driving current based on data stored in the memory 806. The estimation calculation uses current values $id_{n-1}$ and $iq_{n-1}$ which are obtained by converting the current values $i\alpha$ and $i\beta$ generated in the PWM cycle immediately before from the stationary coordinate system to the rotating coordinate system and a phase $\theta_{n-1}$ determined based on the detection value of the driving current in the PWM cycle immediately before.

<Estimation of Driving Current>

Figure 9:
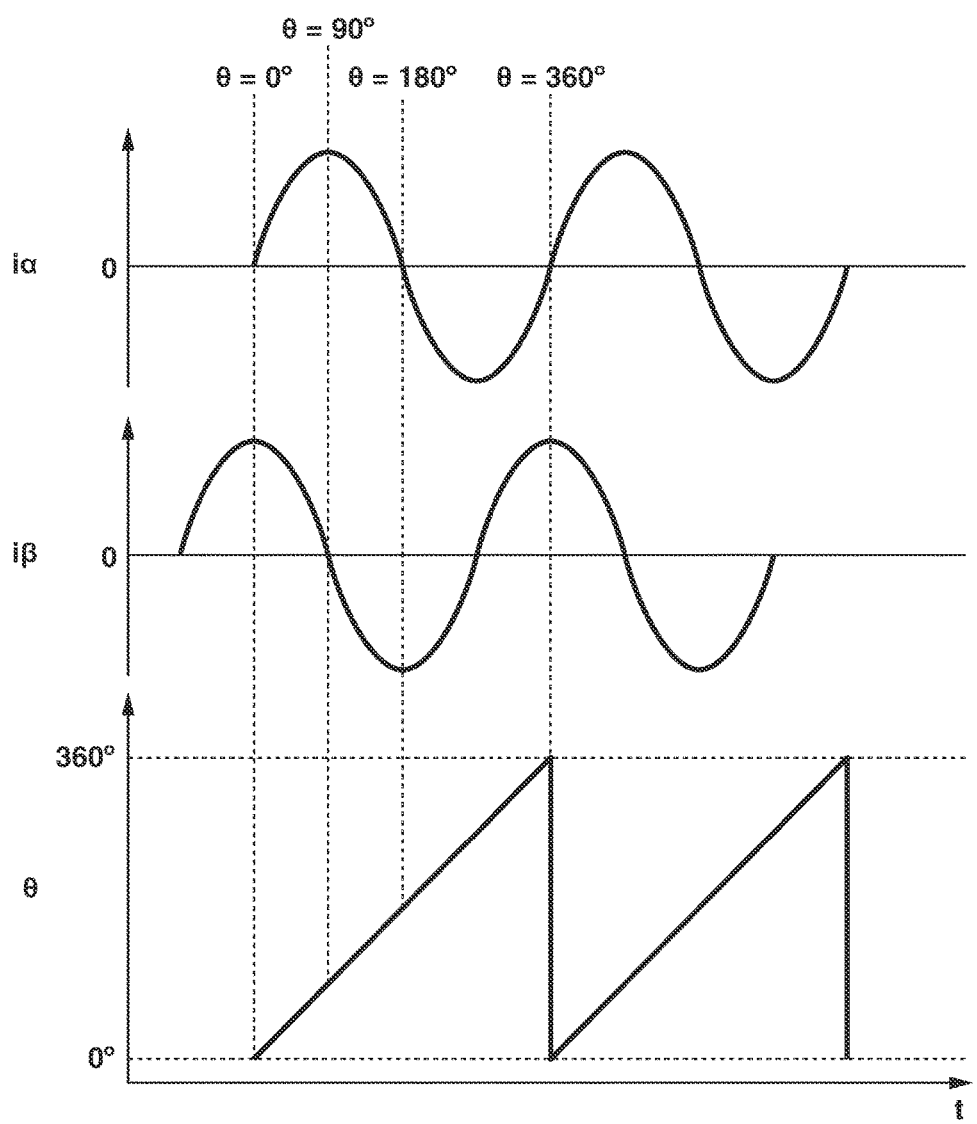
FIG. 9 illustrates an example of estimation of a driving current by a current estimation unit.

Next, an estimation method of the driving current by the current estimation unit 804 is described. FIG. 9 illustrates the driving currents $i\alpha$ and $i\beta$ respectively flowing through the windings of the A phase and the B phase derived from the formulae (1) and the phase θ derived from the formula (5). In FIG. 9, the driving current $i\alpha$ corresponding to the A phase and the driving current $i\beta$ corresponding to the B phase are respectively illustrated as a cosine wave and a sine wave.

Here, the rotating speed of the stepping motor 509 which is obtained by differentiating the phase θ as the formula (6) is regarded as ω [rpm] and a pole number of the stepping motor 509 is regarded as N (for example, N=50). In this case, a variation Δθ of the phase θ per second of the stepping motor 509 is calculated by the following formula.

$$\Delta\theta = \omega/60 \text{ [sec]} * N * 360 \text{ [degree]} \quad (7)$$

In addition, when a frequency of detection (sampling) of the driving current is regarded as Fs (for example, 50 kHz), a variation Δθs of the phase θ in a sampling interval (the PWM cycle) is calculated as below.

$$\Delta\theta s = \Delta\theta / Fs \quad (7)$$

For example, when ω=300 [rpm], the variation is calculated as Δθs=1.8°.

The current estimation unit 804 estimates the current values $i\alpha\_e$ and $i\beta\_e$ of the driving current using the following formulae (8) based on Δθs, the phase $\theta_{n-1}$ and the current values $id_{n-1}$ and $iq_{n-1}$ determined in the PWM cycle immediately before.

$$i\alpha\_e = \cos(\theta_{n-1} + \Delta\theta s) * iq_{n-1} - \sin(\theta_{n-1} + \Delta\theta s) * id_{n-1}$$

$$i\beta\_e = \sin(\theta_{n-1} + \Delta\theta s) * iq_{n-1} + \cos(\theta_{n-1} + \Delta\theta s) id_{n-1} \quad (8)$$

The current values $id_{n-1}$ and $iq_{n-1}$ are obtained by converting the current values $i\alpha$ and $i\beta$ generated in the PWM cycle immediately before from the stationary coordinate system to the rotating coordinate system.

The formulae (8) indicate that the current values $id_{n-1}$ and $iq_{n-1}$ are inversely converted from the rotating coordinate system to the stationary coordinate system based on a rotation phase changed by the variation Δθs from the phase $\theta_{n-1}$ in the PWM cycle immediately before and thus the estimation values $i\alpha\_e$ and $i\beta\_e$ are calculated. As described above, the current values $i\alpha\_e$ and $i\beta\_e$ at the detection timing at which the detection of the driving current is prohibited by the detection control unit 801 are estimated based on the variation of the phase θ from the phase $\theta_{n-1}$ which is determined (estimated) in the PWM cycle which is one cycle before the (current) PWM cycle including the relevant detection timing to the relevant detection timing. The current estimation unit 804 can use the current values $i\alpha$ and $i\beta$ generated in the PWM cycle immediately before as the current values in the current PWM cycle without performing the estimation calculation described above in order to simplify the processing.

<Detection Flow of Driving Current>

FIG. 10 is a flowchart illustrating a detection flow of the driving current executed by the motor control unit 157. The motor control unit 157 may be configured by a device such as the FPGA and the ASIC, and in that case, the control flow illustrated in FIG. 10 indicates processing procedures according to functions included in such a circuit. The motor control unit 157 executes the control flow illustrated in FIG. 10 for each period of the PWM signal generated by the PWM signal generation units 520a and 520b. Detection of the driving current in the A phase is described below, however, the same can be applied to the detection of the driving current in the B phase.

First, in step S101, the motor control unit 157 (the current value generation unit 550) determines whether the duty ratio DR_a of the PWM signal corresponding to the A phase is less than the first threshold value (10%). When the duty ratio DR_a is less than the first threshold value (YES in step S101), the motor control unit 157 advances the processing to step S103, prohibits the detection of the driving current at the timing ts1, and then advances the processing to step S105. On the other hand, when the duty ratio DR_a is not less than the first threshold value (NO in step S101), the motor control unit 157 advances the processing to step S102 and determines whether the duty ratio DR_a is greater than the second threshold value (90%). When the duty ratio DR_a is greater than the second threshold value (YES in step S102), the motor control unit 157 advances the processing to step S104, prohibits the detection of the driving current at the timing ts2, and then advances the processing to step S105. On the other hand, when the duty ratio DR_a is not greater than the second threshold value (NO in step S102), the motor control unit 157 advances the processing to step S105.

In steps S105 to S108, the motor control unit 157 (the current value generation unit 550) performs the processing similar to those in steps S101 to S104 based on the duty ratio DR_b of the PWM signal corresponding to the B phase, and then advances the processing to step S109.

In step S109, the motor control unit 157 (the current value generation unit 550) determines whether the detection of the driving current is prohibited at both of the timings ts1 and ts2. The motor control unit 157 advances the processing to step S112 when the detection is prohibited at both of the timings ts1 and ts2 (YES in step S109) and advances the processing to step S110 in the case other than that (NO in step S109). In step S112, the motor control unit 157 estimates the driving current by the above-described estimation calculation and then terminates the processing.

In step S110, the motor control unit 157 (the current value generation unit 550) determines whether the detection of the driving current is prohibited only at the timing ts2. The motor control unit 157 advances the processing to step S113 when the detection is prohibited only at the timing ts2 (YES in step S110), and advances the processing to step S111 in the case other than that (NO in step S110). In step S113, the motor control unit 157 detects the driving current at the timing ts1 and then terminates the processing.

In step S111, the motor control unit 157 (the current value generation unit 550) determines whether the detection of the driving current is prohibited only at the timing ts1. The motor control unit 157 advances the processing to step S114 when the detection is prohibited only at the timing ts1 (YES in step S111) and advances the processing to step S115 in the case other than that (NO in step S111). In step S114, the motor control unit 157 detects the driving current at the timing ts2 and then terminates the processing. On the other hand, in step S115, the motor control unit 157 detects the driving current at both of the timings ts1 and ts2. Further, in step S116, the motor control unit 157 calculates an average value of the detection values (the sample values) of the driving currents at the timings ts1 and ts2, generates the calculated average value as the current value iα, and terminates the processing.

As described above, the current value generation unit 550 (the detection control unit 801) selects, at each PWM cycle Tpwm, whether to detect the driving current at the detection timings ts1 and ts2 in the relevant PWM cycle or to estimate the driving current based on the duty ratio of the PWM signal. When the detection of the driving current is not prohibited at (least either of) the detection timings ts1 and ts2, the detection control unit 801 controls the detection value generation unit 802 to execute the detection of the driving current. Further, when the detection of the driving current is prohibited at (both of) the detection timings ts1 and ts2, the detection control unit 801 controls the current estimation unit 804 to execute the estimation of the driving current.

According to the present embodiment, the current values iα and iβ of the driving current can be generated while preventing deterioration of the detection accuracy of the driving current due to the switching noise generated in the driving currents I_a(t) and I_b(t) in accordance with the change in the level of the PWM signal. Accordingly, the estimation accuracy of the rotation phase of the rotor in the stepping motor 509 can be prevented from being deteriorated, and the vector control can be performed without deteriorating control efficiency of the stepping motor 509.

The current value generation unit 550 according to the present embodiment determines, when detecting the current in the A phase, whether to detect the current or to estimate the current based on the duty ratio DR_b so that the switching noise in the B phase is not included in the detection result, however, the processing is not limited to this. For example, the current value generation unit 550 may determine whether to detect the current or to estimate the current based on a relative relationship between the detection timings ts1 and ts2 and a timing at which the PWM signal generated by the PWM signal generation unit 520b is changed between the H level and the L level. More specifically, for example, when a time interval between the detection timings ts1 and ts2 and the timing at which the PWM signal generated by the PWM signal generation unit 520b is changed between the H level and the L level is less than a predetermined time length, the current value generation unit 550 estimates the current. Further, when the time interval between the detection timings ts1 and ts2 and the timing at which the PWM signal generated by the PWM signal generation unit 520b is changed between the H level and the L level is longer than or equal to the predetermined time, the current value generation unit 550 detects the current. The predetermined time length is set to a time in which the switching noise is not included in the detection result if the current detection is performed. The above-described configuration may be applied to the current value generation unit 550. Accordingly, when the current detection is performed in the A phase, the switching noise in the B phase can be prevented from being included in the detection result. The similar configuration may be applied to the case when the current detection is performed in the B phase. According to an embodiment, the motor control apparatus which performs the driving control of the motor by the vector control can prevent the accuracy of detecting the driving current to be supplied to the motor from being deteriorated due to the switching noise. Accordingly, the estimation accuracy of the rotation phase of the rotor in the motor can be prevented from being deteriorated, and the vector control of the motor can be performed without deteriorating control efficiency of the motor.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-135204, filed Jul. 7, 2016, which is hereby incorporated by reference herein in its entirety.

What is claimed is:

1. A motor control apparatus comprising:
a first driving circuit configured to include a plurality of first switching elements of an H bridge circuit and to be connected to a winding of a first phase of a motor;
a second driving circuit configured to include a plurality of second switching elements of an H bridge circuit and to be connected to a winding of a second phase of the motor;
a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;
a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;
a detector configured to detect a driving current flowing through the winding of the first phase;
an estimator configured to estimate the driving current flowing through the winding of the first phase using a current value of a driving current flowing through the winding of the first phase in a past PWM cycle, wherein the PWM cycle is a cycle of the first PWM signal generated by the first pulse generator; and
a selector configured to select, at each PWM cycle, whether to detect a driving current flowing through the winding of the first phase at a detection timing predetermined in the PWM cycle or to estimate a driving current flowing through the winding of the first phase using a current value of a driving current flowing through the winding of the first phase in the past PWM cycle based on a first duty ratio, which is a duty ratio of the first PWM signal and a relative relationship between a change timing of the high level and the low level in the second PWM signal and the detection timing,
wherein the first pulse generator generates the first PWM signal based on a current value of the driving current output from the detector or the estimator.

2. The motor control apparatus according to claim 1,
wherein the selector includes a prohibition unit configured to determine, at each PWM cycle, whether to prohibit detection of the driving current based on the first duty ratio and the relative relationship between the change timing of the high level and the low level in the second PWM signal and the detection timing, and
wherein the selector selects to detect the driving current in a case that the detection of the driving current is not prohibited by the prohibition unit and selects to estimate the driving current in a case that the detection of the driving current is prohibited by the prohibition unit.

3. The motor control apparatus according to claim 2,
wherein the detection timing is a central timing of a period during which the first PWM signal is at the first level and a timing of a half cycle later of the PWM cycle from the central timing,
wherein the prohibition unit determines whether to prohibit the detection of the driving current at each detection timing based on the first duty ratio and the relative relationship between the change timing of the high level and the low level in the second PWM signal and the detection timing, and
wherein the selector selects to detect the driving current in a case that the detection of the driving current is not prohibited at least one of the detection timings in one cycle of the first PWM signal and selects to estimate the driving current in a case that the detection of the driving current is prohibited at all of the detection timings in the one cycle of the first PWM signal.

4. The motor control apparatus according to claim 3,
wherein the first pulse generator and the second pulse generator generate the PWM signals so that a center of a period during which the PWM signal is at the high level matches with a timing of the half cycle later, and
wherein the prohibition unit is configured to:
in a case that the first duty ratio is less than a first threshold value, prohibit the detection of the driving current at the timing of the half cycle later, whereas in a case that the first duty ratio is greater than a second threshold value which is greater than the first threshold value, prohibit the detection of the driving current at the central timing, and
in a case that a second duty ratio which is a duty ratio of the second PWM signal is less than the first threshold value, prohibit the detection of the driving current at the timing of the half cycle later, whereas in a case that the second duty ratio is greater than the second threshold value, prohibit the detection of the driving current at the central timing.

5. The motor control apparatus according to claim 2, wherein the estimator estimates the driving current based on a current value in a PWM cycle immediately before the PWM cycle of the first PWM signal including a timing at which the prohibition unit prohibits the detection of the driving current and a variation in a rotation phase of a rotor of the motor rotating in the PWM cycle.

6. The motor control apparatus according to claim 5, further comprising:
a phase determiner configured to determine a rotation phase of the rotor of the motor; and
a speed determiner configured to determine a rotating speed of the rotor,
wherein the estimator estimates the driving current based on a variation in the rotation phase determined based on the rotating speed determined by the speed determiner and the rotation phase determined by the phase determiner.

7. The motor control apparatus according to claim 6, wherein the estimator estimates the driving current by inversely converting a current value which is obtained by converting a current value in the PWM cycle immediately before from a stationary coordinate system to a rotating coordinate system based on the rotation phase determined by the phase determiner from the rotating coordinate system to the stationary coordinate system based on a second rotation phase which is obtained by adding the variation to the rotation phase determined by the phase determiner.

8. The motor control apparatus according to claim 6, wherein the speed determiner determines the rotating speed of the rotor based on the rotation phase determined by the phase determiner.

9. The motor control apparatus according to claim 6, further comprising a control unit configured to control driving currents flowing through the winding of the first phase and the winding of the second phase based on a value of a torque current component generating torque in the rotor and a value of an excitation current component affecting intensity of a magnetic flux passing through the winding which are expressed in the rotating coordinate system based on the rotation phase determined by the phase determiner so that a deviation between a command phase expressing a target phase of the rotor and the rotation phase determined by the phase determiner becomes smaller.

10. The motor control apparatus according to claim 9, wherein the detector is first detector and the estimator is a first estimator, the motor control apparatus further comprising:
a second detector configured to detect a driving current flowing through the winding of the second phase; and
a second estimator configured to estimate a driving current flowing through the winding of the second phase using a current value of a driving current flowing through the winding of the second phase in the past PWM cycle;
wherein the control unit includes:
an induced voltage determiner configured to determine an induced voltage induced in the winding of the first phase by rotation of the rotor of the motor based on a current value output from the detector or the estimator and determine an induced voltage induced in the winding of the second phase by rotation of the rotor of the motor based on a current value output from the second detector or the second estimator, and
the phase determiner, wherein the phase determiner determines the rotation phase of the rotor of the motor based on the induced voltage of the first phase and the induced voltage of the second phase determined by the induced voltage determiner.

11. The motor control apparatus according to claim 9, wherein the control unit controls the driving current by controlling the excitation current component so as to be zero and by controlling a value of the torque current component.

12. A sheet conveying apparatus comprising:
a conveyance roller configured to convey a sheet;
a motor configured to drive the conveyance roller;
a first driving circuit configured to include a plurality of first switching elements of an H bridge circuit and to be connected to a winding of a first phase of a motor;
a second driving circuit configured to include a plurality of second switching elements of an H bridge circuit and to be connected to a winding of a second phase of the motor;
a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;
a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;
a detector configured to detect a driving current flowing through the winding of the first phase;
an estimator configured to estimate the driving current flowing through the winding of the first phase using a current value of a driving current flowing through the winding of the first phase in a past PWM cycle, wherein the PWM cycle is a cycle of the first PWM signal generated by the first pulse generator; and
a selector configured to select, at each PWM cycle, whether to detect a driving current flowing through the winding of the first phase at a detection timing predetermined in the PWM cycle or to estimate a driving current flowing through the winding of the first phase using a current value of a driving current flowing through the winding of the first phase in the past PWM cycle based on a first duty ratio, which is a duty ratio of the first PWM signal and a relative relationship between a change timing of the high level and the low level in the second PWM signal and the detection timing,
wherein the first pulse generator generates the first PWM signal based on a current value of the driving current output from the detector or the estimator.

13. A document feeding apparatus comprising:
a document tray configured to stack a document thereon;
a conveyance roller configured to convey the document stacked on the document tray;
a motor configured to drive the conveyance roller;
a first driving circuit configured to include a plurality of first switching elements of an H bridge circuit and to be connected to a winding of a first phase of a motor;
a second driving circuit configured to include a plurality of second switching elements of an H bridge circuit and to be connected to a winding of a second phase of the motor;
a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;
a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;
a detector configured to detect a driving current flowing through the winding of the first phase;
an estimator configured to estimate the driving current flowing through the winding of the first phase using a current value of a driving current flowing through the winding of the first phase in a past PWM cycle, wherein the PWM cycle is a cycle of the first PWM signal generated by the first pulse generator; and
a selector configured to select, at each PWM cycle, whether to detect a driving current flowing through the winding of the first phase at a detection timing predetermined in the PWM cycle or to estimate a driving current flowing through the winding of the first phase using a current value of a driving current flowing through the winding of the first phase in the past PWM cycle based on a first duty ratio, which is a duty ratio of the first PWM signal and a relative relationship between a change timing of the high level and the low level in the second PWM signal and the detection timing, wherein the first pulse generator generates the first PWM signal based on a current value of the driving current output from the detector or the estimator.

14. A document reading apparatus comprising:

a document tray configured to stack a document thereon;

a conveyance roller configured to convey the document stacked on the document tray;

a reading unit configured to read the document conveyed by the conveyance roller;

a motor configured to drive the conveyance roller;

a first driving circuit configured to include a plurality of first switching elements of an H bridge circuit and to be connected to a winding of a first phase of a motor;

a second driving circuit configured to include a plurality of second switching elements of an H bridge circuit and to be connected to a winding of a second phase of the motor;

a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;

a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;

a detector configured to detect a driving current flowing through the winding of the first phase;

an estimator configured to estimate the driving current flowing through the winding of the first phase using a current value of a driving current flowing through the winding of the first phase in a past PWM cycle, wherein the PWM cycle is a cycle of the first PWM signal generated by the first pulse generator; and a selector configured to select, at each PWM cycle, whether to detect a driving current flowing through the winding of the first phase at a detection timing predetermined in the PWM cycle or to estimate a driving current flowing through the winding of the first phase using a current value of a driving current flowing through the winding of the first phase in the past PWM cycle based on a first duty ratio, which is a duty ratio of the first PWM signal and a relative relationship between a change timing of the high level and the low level in the second PWM signal and the detection timing, wherein the first pulse generator generates the first PWM signal based on a current value of the driving current output from the detector or the estimator.

15. An image forming apparatus comprising:

an image formation unit configured to form an image on a recording medium;

a conveyance roller configured to convey the recording medium;

a motor configured to drive the conveyance roller;

a first driving circuit configured to include a plurality of first switching elements of an H bridge circuit and to be connected to a winding of a first phase of a motor;

a second driving circuit configured to include a plurality of second switching elements of an H bridge circuit and to be connected to a winding of a second phase of the motor;

a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;

a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;

a detector configured to detect a driving current flowing through the winding of the first phase;

an estimator configured to estimate the driving current flowing through the winding of the first phase using a current value of a driving current flowing through the winding of the first phase in a past PWM cycle, wherein the PWM cycle is a cycle of the first PWM signal generated by the first pulse generator; and a selector configured to select, at each PWM cycle, whether to detect a driving current flowing through the winding of the first phase at a detection timing predetermined in the PWM cycle or to estimate a driving current flowing through the winding of the first phase using a current value of a driving current flowing through the winding of the first phase in the past PWM cycle based on a first duty ratio, which is a duty ratio of the first PWM signal and a relative relationship between a change timing of the high level and the low level in the second PWM signal and the detection timing, wherein the first pulse generator generates the first PWM signal based on a current value of the driving current output from the detector or the estimator.

16. An image forming apparatus to form an image on a recording medium, the image forming apparatus comprising:

a motor configured to drive a load;

a first driving circuit configured to include a plurality of first switching elements of an H bridge circuit and to be connected to a winding of a first phase of a motor;

a second driving circuit configured to include a plurality of second switching elements of an H bridge circuit and to be connected to a winding of a second phase of the motor;

a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;

a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;

a detector configured to detect a driving current flowing through the winding of the first phase;

an estimator configured to estimate the driving current flowing through the winding of the first phase using a current value of a driving current flowing through the winding of the first phase in a past PWM cycle, wherein the PWM cycle is a cycle of the first PWM signal generated by the first pulse generator; and a selector configured to select, at each PWM cycle, whether to detect a driving current flowing through the winding of the first phase at a detection timing predetermined in the PWM cycle or to estimate a driving current flowing through the winding of the first phase using a current value of a driving current flowing through the winding of the first phase in the past PWM cycle based on a first duty ratio, which is a duty ratio of the first PWM signal and a relative relationship between a change timing of the high level and the low level in the second PWM signal and the detection timing, wherein the first pulse generator generates the first PWM signal based on a current value of the driving current output from the detector or the estimator.

17. The image forming apparatus according to claim 16, wherein the load is a conveyance roller conveying the recording medium.

18. A motor control apparatus comprising:

a first driving circuit configured to include a plurality of first switching elements of an H bridge circuit and to be connected to a winding of a first phase of a motor;

a second driving circuit configured to include a plurality of second switching elements of an H bridge circuit and to be connected to a winding of a second phase of the motor;

a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;

a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;

a detector configured to detect a value of a current flowing through the winding of the first phase to be used for generating the first PWM signal;

an estimator configured to estimate a value to be used for generating the first PWM signal based on a value which has been used for generating the first PWM signal in a past PWM cycle, wherein the PWM cycle is a cycle of the first PWM signal generated by the first pulse generator; and a determiner configured to determine, based on a first duty ratio, which is a duty ratio of the first PWM signal and a second duty ratio which is a duty ratio of the second PWM signal, whether to use the value detected by the detector for generating the first PWM signal or to use the value estimated by the estimator for generating the first PWM signal, wherein the first pulse generator generates the first PWM signal based on a determination result of the determiner.

19. A motor control apparatus comprising:

a first driving circuit configured to include a plurality of first switching elements of an H bridge circuit and to be connected to a winding of a first phase of a motor;

a second driving circuit configured to include a plurality of second switching elements of an H bridge circuit and to be connected to a winding of a second phase of the motor;

a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;

a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;

a detector configured to detect a value of a current flowing through the winding of the first phase to be used for generating the first PWM signal;

an estimator configured to estimate a value to be used for generating the first PWM signal based on a value which has been used for generating the first PWM signal in a past PWM cycle, wherein the PWM cycle is a cycle of the first PWM signal generated by the first pulse generator; and a determiner configured to determine the value estimated by the estimator as the value to be used for generating the first PWM signal in a case where a first time period, in which the first PWM signal is at the first level, is shorter than a first predetermined time period and a second time period, in which the second PWM signal is at the first level, is longer than a second predetermined time period, and determine the value detected by the detector as the value to be used for generating the first PWM signal in a case where the first time period is shorter than the first predetermined time period and the second time period is shorter than the second predetermined time period, wherein the first pulse generator generates the first PWM signal based on a determination result of the determiner.

20. The motor control apparatus according to claim 19, wherein the determiner determines the value estimated by the estimator as the value to be used for generating the first PWM signal in a case where the first time period is longer than the first predetermined time period and the second time period is shorter than the first predetermined time period, and determines the value detected by the detector as the value to be used for generating the first PWM signal in a case where the first time period is longer than the first predetermined time period and the second time period is longer than the first predetermined time period.

21. The motor control apparatus according to claim 19, wherein the second predetermined time period is longer than the first predetermined time period.

22. A motor control apparatus comprising:

a first driving circuit configured to include a plurality of first switching elements of an H bridge circuit and to be connected to a winding of a first phase of a motor;

a second driving circuit configured to include a plurality of second switching elements of an H bridge circuit and to be connected to a winding of a second phase of the motor;

a first pulse generator configured to generate a first pulse width modulation (PWM) signal for controlling an ON operation and an OFF operation of the plurality of first switching elements, wherein the first PWM signal includes a signal at a first level which is one of a high level and a low level and a signal at a second level which is another one of the high level and the low level;

a second pulse generator configured to generate a second PWM signal for controlling an ON operation and an OFF operation of the plurality of second switching elements, wherein the second PWM signal includes a signal at the first level and a signal at the second level and has a same cycle as that of the first PWM signal;

a detector configured to detect a value of a current flowing through the winding of the first phase to be used for generating the first PWM signal;

an estimator configured to estimate a value to be used for generating the first PWM signal based on a value which has been used for generating the first PWM signal in a past PWM cycle, wherein the PWM cycle is a cycle of the first PWM signal generated by the first pulse generator; and a determiner configured to determine the value estimated by the estimator as the value to be used for generating the first PWM signal in a case where a first time period, in which the first PWM signal is at the first level, is longer than a first predetermined time period and a second time period, in which the second PWM signal is at the first level, is shorter than a second predetermined time period, and determine the value detected by the detector as the value to be used for generating the first PWM signal in a case where the first time period is longer than the first predetermined time period and the second time period is longer than the second predetermined time period, wherein the first pulse generator generates the first PWM signal based on a determination result of the determiner.

23. The motor control apparatus according to claim 22, wherein the determiner determines the value estimated by the estimator as the value to be used for generating the first PWM signal in a case where the first time period is shorter than the first predetermined time period and the second time period is longer than the first predetermined time period, and determines the value detected by the detector as the value to be used for generating the first PWM signal in a case where the first time period is shorter than the first predetermined time period and the second time period is shorter than the first predetermined time period.

24. The motor control apparatus according to claim 22, wherein the second predetermined time period is longer than the first predetermined time period.

* * * * *